United States Patent [19]

Nabet et al.

[11] Patent Number: 5,130,563
[45] Date of Patent: Jul. 14, 1992

[54] OPTOELECTRONIC SENSORY NEURAL NETWORK

[75] Inventors: Bahram Nabet, Philadelphia, Pa.; Robert B. Darling, Wash.; Robert B. Pinter, both of Seattle, Wash.

[73] Assignee: Washington Research Foundation, Seattle, Wash.

[21] Appl. No.: 713,550

[22] Filed: Jun. 7, 1991

Related U.S. Application Data

[63] Continuation of Ser. No. 444,638, Nov. 30, 1989, abandoned.

[51] Int. Cl.$^5$ .............................................. G06G 7/00
[52] U.S. Cl. .................................... 307/201; 364/807
[58] Field of Search ................ 307/201; 364/513, 807, 364/822, 841

[56] References Cited

U.S. PATENT DOCUMENTS

| | | | |
|---|---|---|---|
| 4,156,284 | 5/1979 | Eugeler | 364/841 X |
| 4,731,747 | 3/1988 | Denker | 307/201 X |
| 4,800,519 | 1/1989 | Grinberg et al. | 364/841 X |
| 4,874,963 | 10/1989 | Alsperton | 307/201 |
| 4,897,811 | 1/1990 | Scofield | 364/513 X |
| 4,926,064 | 5/1990 | Tapang | 307/201 |
| 4,956,564 | 9/1990 | Holler et al. | 307/201 |

OTHER PUBLICATIONS

Bashor, "An Experiment in Learning" *Electronics* Jul. 22, 1960, pp. 57–59.
M. A. Mahowald and C. Mead, "Silicon Retina," Chapter 15 in *Analog VLSI and Neural Systems*, C. Mead, ed., Addison-Wesley, N.Y., 1989.
G. Petrie, "Practical Implementation of Nonlinear Lateral Inhibition Using Junction Field-Effect Transistors," Thesis for Master of Science Degree in Electrical Engineering, University of Washington, 1984.

*Primary Examiner*—David Hudspeth
*Attorney, Agent, or Firm*—Christensen, O'Connor, Johnson & Kindness

[57] ABSTRACT

A neural network for processing sensory information. The network comprise one or more layers including interconnecting cells having individual states. Each cell is connected to one or more neighboring cells. Sensory signals and signals from interconnected neighboring cells control a current or a conductance within a cell to influence the cell's state. In some embodiments, the current or conductance of a cell can be controlled by a signal arising externally of the layer. Each cell can comprise an electrical circuit which receives an input signal and causes a current corresponding to the signal to pass through a variable conductance. The conductance is a function of the states of the one or more interconnecting neighboring cells. Proper interconnection of the cells on a layer can produce a neural network which is sensitive to predetermined patterns or the passage of such patterns across a sensor array whose signals are input into the network. The layers in the network can be made sensitive to distinct sensory parameters, so that networks which are sensitive to different wavelengths or polarizations of light energy can be produced.

31 Claims, 20 Drawing Sheets

OPTOELECTRONIC SENSORY NEURAL NETWORK

GOVERNMENT RIGHTS

This invention was made with government support under grant number MIP-8822121 awarded by the National Science Foundation. The government has certain rights in the invention.

This application is a continuation application based on prior copending application Ser. No. 07/444,638 filed Nov. 30, 1989 abandoned.

1. Technical Field

This invention relates to neural networks, and more particularly, to massively parallel analog shunting neural networks.

2. Background Art

There has long been interest in implementing models of biological processes in electronic forms. Prominent among these models are models of sensory processing by biological systems, for example, processing of visual information. From this perspective, then, biological systems can not only be simulated by the electronic implementations, but they may also be studied on the basis of the underlying mathematics upon which the models are based.

Presently, neural network models are finding significant value in the study of biological systems, especially of sensory systems. Models of biological neural networks can take the form of multi-layer networks. However, the inventors have focused primarily on one-layer networks, with the realization that multi-layer networks can be developed from the one-layer networks. Accordingly, the following specification is primarily centered on one-layer neural networks, which can be described by the equations of short term memories.

Shunting neural networks are networks in which multiplicative, or shunting, terms of the form $x_i \Sigma_j f_j(x_j)$ or $x_i \Sigma_j I_j$ appear in the short term memory equations, where $x_i$ is activity of a cell or a cell population or an iso-potential portion of a cell and $I_i$ are external inputs arriving at each site. $I_i$ may be a sensory, or any, variable. The first form shows recurrent activity, while the second form is non-recurrent or feed forward. The polarity of these terms signify excitatory or inhibitory interactions.

Shunting network equations can be derived from various sources, such as the passive membrane equation with synaptic interaction. Derivations are given by Poggio et al., in A new approach to synaptic interactions, THEORETICAL APPROACHES TO COMPLEX SYSTEMS, LECTURE NOTES IN BIOMATHEMATICS, vol. 21, R. Heim and G. Palm, eds., New York:Springer-Verlog, and The electrophysiological bases for linear and nonlinear product term lateral inhibition and the consequences for wide-field textured stimuli, J. THEOR. BIOL., 105, pp. 233-243, 1983. Examples of these equations are given in Contour enhancement, Short term memory and constancies in reverberating neural networks, STUDIES IN APPLIED MATHEMATICS, 52, pp. 217-257 by Grossberg (1973). Models of dendritic interaction are given by Rall in Core conductor theory and cable properties of neurons, HANDBOOK OF PHYSIOLOGY: THE NERVOUS SYSTEM, vol. I, part I, pp. 39-97, American Physiological Society, 1977 and METHODS IN NEURONAL MODELING, Koch et al., Cambridge:MIT Press, 1989, and experiments on motoneurons are described by Ellias and Grossberg in Pattern formation, contrast control, and oscillations in the short term memory of shunting on-center off-surround networks, BIOLOGICAL CYBERNETICS, 20, pp. 69-98, 1975.

While the exact mechanisms of synaptic interactions are not known in every individual case, neurobiological evidence of shunting interactions appear in several areas such as sensory systems, cerebellum, neocortex, and hippocampus. This was described by Grossberg in the paper cited above, and by Pinter in Visual system neural networks: Feedback and feedforward lateral inhibition, SYSTEMS AND CONTROL ENCYCLOPEDIA, (ed. M. G. Singh) Oxford:Pergamon Press, pp. 5060-5065, 1987. In addition to neurobiology, these networks have been used to successfully explain data from disciplines ranging from population biology, for example, by Lotka in ELEMENTS OF MATHEMATICAL BIOLOGY, New York:Dover, 1956, to psychophysics and behavioral psychology, as described by Grossberg in The quantized theory of visual space: The coherent computation of depth, form, and lightness, THE BEHAVIORAL AND BRAIN SCIENCES 6, pp. 625-692, 1983.

Shunting nets have important advantages over additive models which lack the extra nonlinearity introduced by the multiplicative terms. For example, the total activity of the network, shown by $\Sigma_i x_i$, approaches a constant even as the input strength grows without bound. This normalization, in addition to being computationally desirable, has interesting ramifications in visual psychophysics as described by Grossberg in his 1983 paper, cited above. Introduction of multiplicative terms also provides a negative feedback loop which automatically controls the gain of each cell, contributes to the stability of the network, and allows for large dynamic range of the input to be processed by the network. The automatic gain control property, in conjunction with properly chosen nonlinearities in the feedback loop, makes the network sensitive to small input values by suppressing noise while not saturating at high input values. This was noted by Grossberg in 1973. Finally, shunting nets have been shown to account for short term adaptation to input properties, such as adaptation level tuning and the shift of sensitivity with background strength (by Grossberg, in 1983), dependence of visual size preference and latency of response on contrast and mean luminance, and dependence of temporal and spatial frequency tuning on contrast and mean luminance (by Pinter, in Adaptation of spatial modulation transfer functions via nonlinear lateral inhibition, BIOLOGICAL CYBERNETICS, 51, pp. 285-291, 1985).

Disclosure of the Invention

It is an object of the present invention to provide a neural cell.

It is another object of the present invention to provide a neural network composed of neural cells interconnected to neighboring cells.

It is an additional object of the present invention to provide a neural network composed of neural cells interconnected to closely-neighboring cells.

Also, an object of the present invention is to provide a neural network composed of neural cells interconnected over short-range distances.

It is a further object of the present invention to provide a neural network which is adapted to process visual sensory signals.

It is still a further object of the present invention to provide a neural network which is adapted to filter sensory signals.

It is yet another object of the present invention to provide a neural network having a directional selectivity with respect to sensory signals.

A still further object of the present invention is to provide a neural network having a programmable interconnect scheme.

According to one aspect, the invention is a cell for use in a layer of a neural network for processing a plurality of input signals, where the network consists of a plurality of such cells and each cell has one or more neighbor cells. The cell comprises an electrical circuit into which a predetermined input current is imposed. The electrical circuit is a series combination of means for receiving one of the plurality of input signals and producing a corresponding electrical current and parallel circuit means for receiving the electrical current and presenting a variable conductance to the electrical current. A voltage is developed across the variable conductance characterizing the state of the cell. The parallel circuit means comprises the parallel combination of a capacitor and means for presenting a conductance which is a function of the voltages characterizing the states of the one or more neighbor cells.

According to another aspect, the invention is a neural network consisting of a plurality of cells connected in a neighboring relationship wherein each cell has one or more neighbor cells. Each cell is characterized by a state voltage and comprises means for receiving a signal representing a sensory input on a peripheral level and means for transforming the sensory input signal to a corresponding conductance. The cell also comprises means for sensing voltages characterizing the states of the neighbor cells and means for producing a conductance corresponding to each of the states in a feedforward subset of the states of the neighbor cells. The cell further comprises means for producing a conductance corresponding to each of the states in a feedback subset of the states of the neighbor cells, the feedback subset being disjoint from the feedforward subset. In addition, the cell comprises means for producing a positive state current corresponding to the integral of the state voltage of the cell, where the current is transmitted through a capacitive element and produces a resulting change in a voltage across the capacitive element. Further, the cell comprises means for producing a positive feedback current through a conductance depending on the voltages characterizing the states in the feedback subset of the states of the adjacent cells, where the current produces a resulting feedback change in the voltage across the capacitive element. In addition, the cell comprises means for producing a negative feedforward current through a conductance depending on the voltages characterizing the states in the feedforward subset of the states of the adjacent cells. The current produces a resulting feedforward change in the voltage across the capacitive element.

In a further aspect, the invention is a neural network consisting of a plurality of cells connected in a neighboring relationship wherein each cell has one or more neighbor cells. In the network, each cell is characterized by a state voltage and comprises selective means for receiving a signal representing a sensory input on a peripheral level, means for transforming the selected sensory input signal to a corresponding conductance, and programmable means for sensing the states of the neighbor cells. Further each cell comprises means for producing a conductance corresponding to each of the states in a feedforward subset of the states of the neighbor cells, means for producing a conductance corresponding to each of the states in a feedback subset of the states of the neighbor cells. The feedback subset is disjoint from the feedforward subset. Also, each cell comprises means for producing a positive state current corresponding to the integral of the state voltage of the cell, where the current is transmitted through a capacitive element and produces a resulting change in a voltage across the capacitive element. In addition, the cell comprises means for producing a positive feedback current through a conductance depending on the voltages characterizing the states in the feedback subset of the states of the adjacent cells. The current is transmitted through the capacitive element and produces a resulting feedback change in the voltage across the capacitive element. Each cell also comprises means for producing a negative feedforward current through a conductance depending on the voltages characterizing the states in the feedforward subset of the states of the adjacent cells. The current produces a resulting feedforward change in the voltage across the capacitive element.

BEST MODES FOR CARRYING OUT THE INVENTION

The advantages, generality, and applicability of shunting nets as cited previously make their implementation very desirable, but digital implementation of these networks is very inefficient due to the need for analog to digital conversion, multiplication and addition instructions, and implementation of iterative algorithms. On the other hand, a non-linear feedback class of these networks $(x_i \Sigma_j f_j(x_j) = x_i \Sigma_j K_{ij} x_j)$ can be implemented very efficiently with simple, completely parallel, and all analog circuits.

Figure 1:
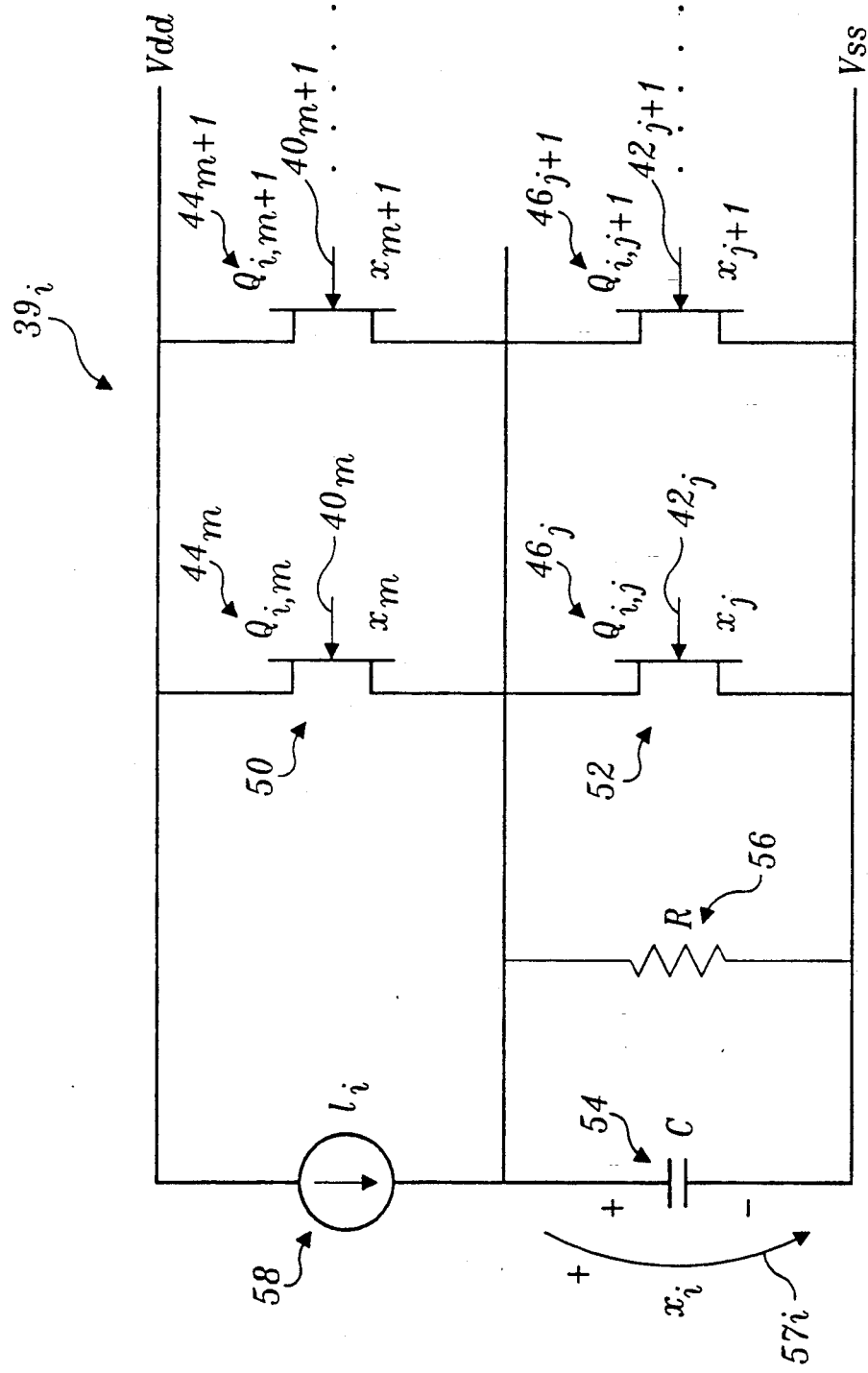
FIG. 1 is a design framework for implementation of one cell in a shunting network.

FIG. 1 shows the design framework for analog implementation of one cell $39_i$ in a class of shunting nets. The voltage outputs of the other cells are connected to the gates $40_m$ and $42_j$ of transistors $44_m$ and $46_j$, respectively.

In this design, addition (subtraction) is achieved via Kirchoff's current law by placing transistors $44_m$ ($46_j$) in upper (lower) rails 50 (52). Either depletion or enhancement mode transistors may be chosen. The choice is dictated by voltage level translation between stages. A multiplicative, or shunting, interconnection is made with a single transistor $44_m$ ($46_j$) per interconnect, using a field-effect transistor (FET) in the voltage-variable conductance region. Temporal properties are characterized by cell membrane capacitance 54 (C farads), which can be removed or effectively replaced by the parasitic device capacitances (as in FIG. 1), if higher speed is desired. The capacitor 54 is in parallel with the resistor 56 (R ohms). This parallel circuit experiences a voltage drop $57_i$ as a result of the current imposed by the current source $58_i$. The current source $58_i$ can be different for each of the cells. A buffer stage (not shown) can be necessary for correct polarity of interconnections and the large fan-out associated with high connectivity of neural networks.

The performance of a one-layer network is fundamentally based on the modulation of the electrical conductance of the single cells which make up the network. Specifically, the conductance of each cell in the network can be modulated by other cells in the network. The simplest shunting network that can be implemented for the general framework of FIG. 1 is that shown in FIG. 2, with only lateral inhibitory connections (lower rail transistors). The network 60 comprises a number of cells $62_1$, $62_2$, and $62_3$ (only three cells are illustrated for purposes of simplicity). Each cell $62_i$ consists of a current source $64_i$, and a parallel circuit $66_i$. The circuits $66_i$ each include a parallel combination of a capacitor $68_i$, a fixed resistance (expressed as a conductance) $70_i$, and two variable, or modulated, conductances $72_i$ and $74_i$. The voltage $76_i$ across the ith cell is, accordingly, determined by the values of the capacitors $68_i$ and the fixed conductances $70_i$. It is also determined by the modulated conductances $72_i$ and $74_i$. The modulated conductances, in turn, are functions of voltages $76_j$, where j is not equal to i.

In the case of multiplicative lateral inhibition (as discussed by Pinter in Adaptation of receptive field spatial organization by multiplicative lateral inhibition, J. THEOR. BIOL., 110, pp. 435–444, 1983), the values of the conductances $72_i$ and $74_i$ are determined by the voltages $x_{i-1}$ and $x_{i+1}$, across the adjoining cells.

Such a circuit is capable of implementing the general network equation:

$$\frac{dx_i}{dt} = \pm I_i \pm a_i x_i \pm x_i(K_i x_i) \pm x_i \sum_{j \neq i} K_{ij} x_j \pm \sum_j K_j x_j^2, \quad (1)$$

Excitatory and inhibitory input current sources can also be shunted, with extra circuitry, to implement non-recurrent shunting networks.

The simplicity of the implementation is notable; a linear array with nearest neighbor interconnects consists of a cell including only five transistors, one to three diodes, and, if required, one capacitor per cell.

Figure 3:
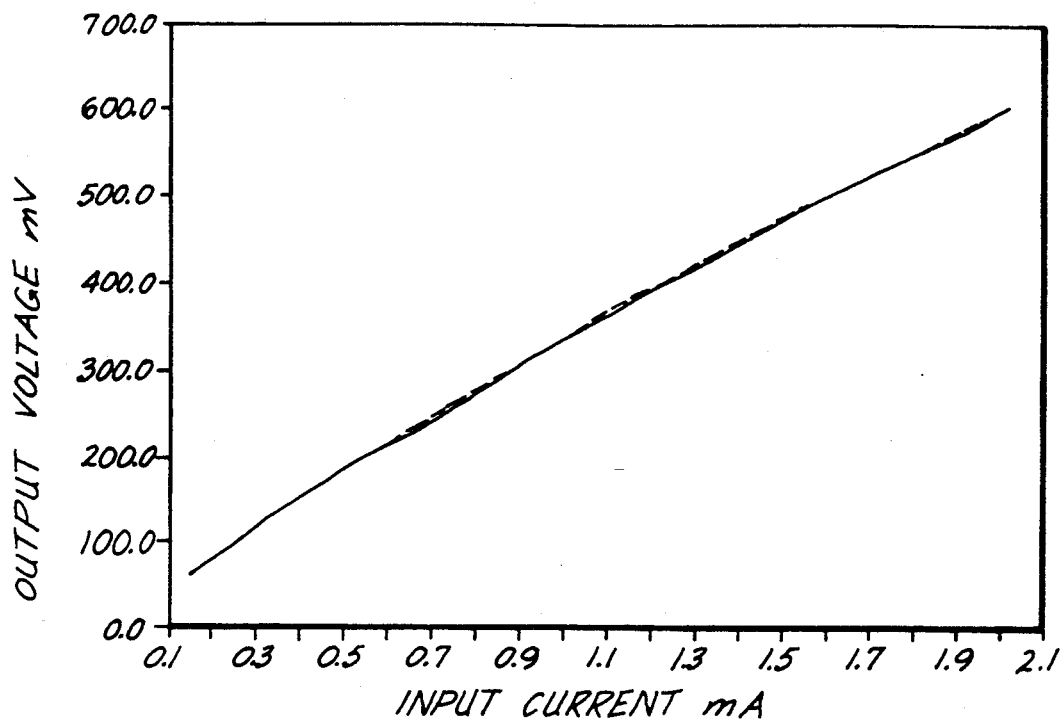
FIG. 3 is a graph of the response of the neural network to uniform input. The output is proportional to the square root of the input, a nonlinear property of this network incorporating MLI.
Figure 4:
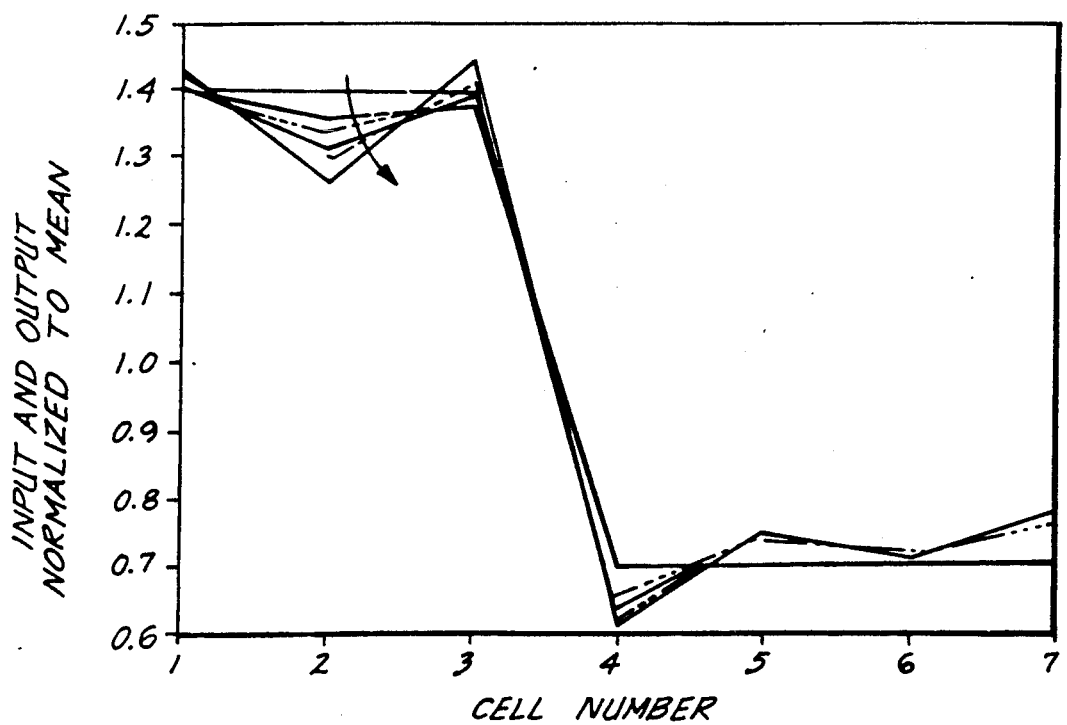
FIG. 4 is a graph of the response of the neural network to spatial edge patterns with the same contrast but increasing mean input level, a nonlinear property of this network incorporating MLI.

A discrete element version of this implementation has been constructed and has properties that are in good agreement with those expected. FIG. 3 is a graph of the response of the discrete element neural network 50 to uniform input. The steady state output is proportional to the square root of the input. Therefore, the network compresses the input data. Further, as will be demonstrated subsequently, the network also shows adaptation to mean input intensity. FIG. 4 is a graph of the response of the neural network to spatial edge patterns with the same contrast but increasing mean input level. The network 60 exhibits contrast enhancement of spatial edges which increases with higher mean input strength, as will be discussed subsequently.

Figure 5:
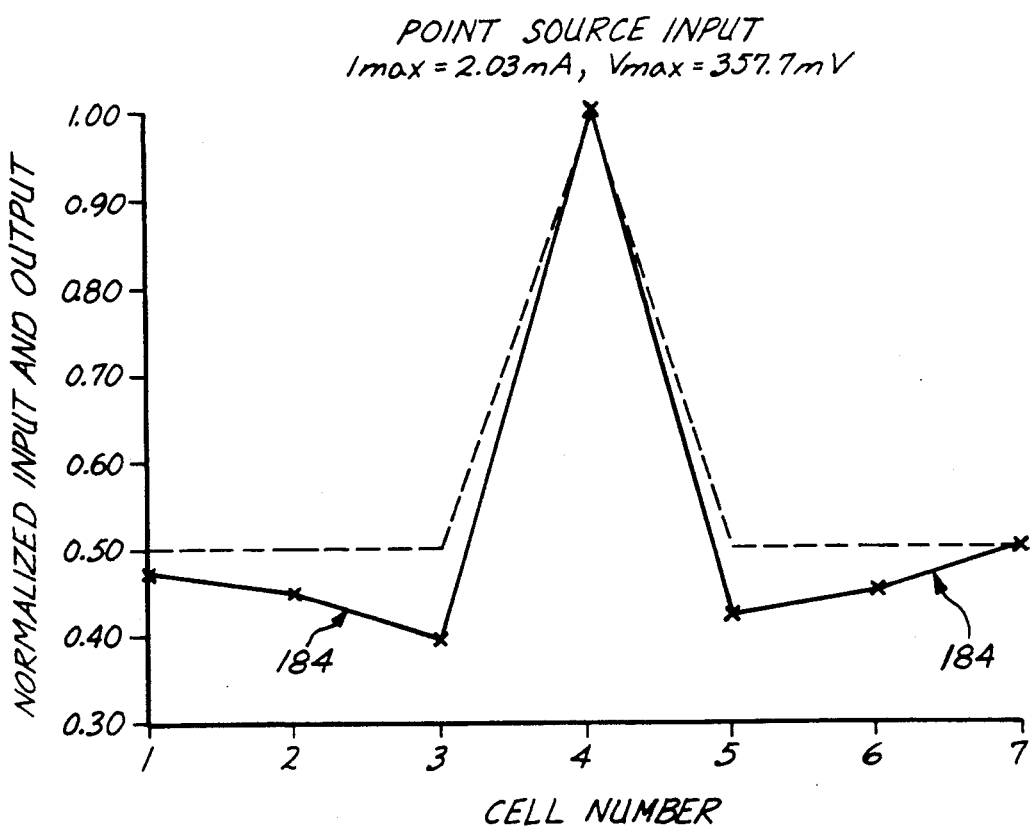
FIG. 5 is a graph of the response of the neural network to a point source input, with and without interconnects.
Figure 5A:
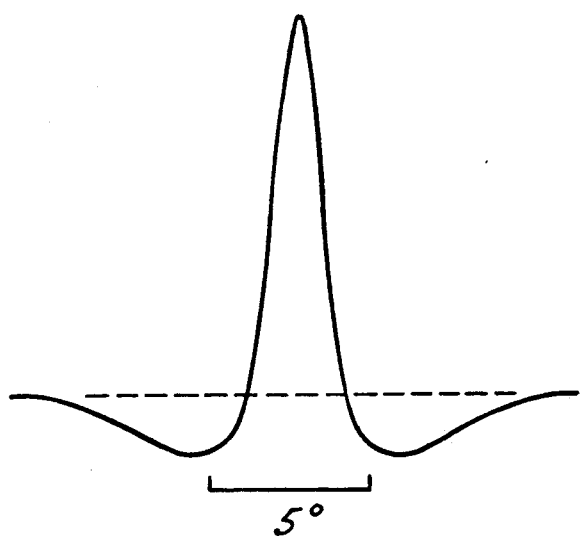
FIG. 5A shows the light-adapted receptive field of fly's lamina monopolar cells (LMC of *Lucilia sericata*). The horizontal axis is visual angle, vertical axis relative voltage units of hyperpolarization.

A point source input elicits an on-center off-surround response, similar to the difference-of-Gaussians receptive field of many excitable cells. FIG. 5 is a graph of the response of the neural network 60 to a point source input. It, too, will be discussed subsequently. The "receptive field" of the network 60 becomes more pronounced as the input intensity increases, showing the dependence of spatial frequency tuning on mean input level. The temporal response of the network 60 is also input dependent since the time constant of the exponential decay of the impulse response decreases with input intensity. Finally, the dependence of the above properties on mean input strength can be tuned by varying the conductance of the transistor 42 (see FIG. 1) in the central cell (see FIG. 2). FIG. 5A shows the receptive field of fly's lamina monopolar cells (LMC of *Lucilia sericata*). The horizontal axis is visual angle, and the vertical axis is hyperpolarization measured in relative voltage units. It is apparent that the response of the neural network of the present invention responds similarly to the LMC of *Lucilia sericata*.

CONTENT ADDRESSABILITY AND RELATION TO THE PRESENT INVENTION

Using a theorem by Cohen and Grossberg, described in Absolute stability of global pattern formation and parallel memory storage by competitive neural networks, IEEE TRANS. SYSTEMS MAN CYBER. SMC-13, pp. 815-826, 1983, it can be shown that the network equation (1) admits the global Liapunov functions $$v = -(I_i \ln(x_i/\lambda) - a_i x_i + K_i x_i) + K_{ij} x_j x_k/2, \quad (2)$$

where $\lambda$ is a constant, under the constraints $K_{ij} = K_{ji}$ and $x_i > 0$. This shows that in response to an arbitrary input the network always approaches an equilibrium point representing a stored pattern. This property is known as the Content Addressable Memory (CAM) property.

In addition, Eq. (1) is a special case of the feature representation field of an analog adaptive resonance theory ART-2 circuit, and hence this design can operate as a module in learning multilayer ART architecture. See ART 2: Self organization of stable category recognition codes for analog input patterns, by Carpenter and Grossberg, in COMPUTER, 21, pp. 77-88, 1987.

Cell Body And Temporal Characteristics

As mentioned previously, the cell $39_i$ (in FIG. 1), which has also been called a "neuron" or a "processing unit," simply consists of a capacitor 54 in parallel with a resistor 56. This is in direct analogy with the cell membrane capacitance and conductance of an isopotential portion of a biological neuron. The capacitor 54 in this simple circuit characterizes the temporal integration property of neurons. Spatial integration, or summation, is achieved by placing conductance inputs dependent on the state voltages $57_i$ of other cells in parallel with the cell resistance.

For practical applications, if characterization of temporal properties is not of importance, the capacitor 54 can be removed. Alternatively, the capacitor 54 can be effectively replaced with the parasitic capacitances that are present in any implementation. This allows for very high speed operation, possibly in the gigaHertz range for GaAs MESFETs. The parallel nature of the implementation means that the total speed of operation is on the same order of magnitude as N times the operating speed of each cell $39_i$, where N is the number of cells in the network. On the other hand, if accurate time dependencies need be studied, the capacitor 54 can be replaced by a circuit which compares the present output with its delayed version. When this comparison is performed by subtraction, the circuit performs a crude differentiation operation. A circuit that performs such a differentiation has been employed as described in the Proceedings of the Stanford Conference on Advanced Research in VLSI, by Sivilotti et al. in 1987, and by Mead and Mahowald in A silicon model of early visual processing, NEURAL NETWORKS, vol. 1 pp. 91-97, 1988.

The output or state $57_i$ of such a neuron $39_i$ is a continuous valued, or analog, function which is analogous to the slow potential of biological neurons. However, it is not similar to the action potential stream (CELLULAR BASIS OF BEHAVIOR, Freeman and Company: San Francisco, by E. R. Kandel, 1976) which is the primary method of communication in the nervous system. For modelling purposes an action potential stream could be regarded as the average firing rate of a neuron. In this case, it is implicitly assumed that the absolute timing and amplitude of action potentials do not have processing significance.

A more abstract view of the "cell potential" state variable is as the number of cells in a cell population which are active or "on" at a given time. This has been described by Grossberg, in STUDIES OF MIND AND BRAIN: NEURAL PRINCIPLES OF LEARNING, PERCEPTION, DEVELOPMENT, COGNITION, AND MOTOR CONTROL, Boston:- Reidel Press, 1982. This interpretation thus assumes neurons of an all-or-none character. It has the advantage of describing the statistics of a population rather than the behavior of one neuron and thus uses stochastic analysis rather than deterministic techniques.

Shunting Recurrent Circuitry

The basic cell of FIG. 1 is very similar to a standard logic gate inverter, but with the transistors sized by gate width-to-length ratio to operate in the nonsaturated current region. Accordingly, it is applicable to a variety of FET technologies including NMOS, CMOS, and gallium arsenide (GaAs).

A circuit, such as that of FIG. 1, made of all depletion-mode devices, such as GaAs MESFET buffered FET logic, can implement all the terms of Eq. (1) except shunting excitatory terms. In addition, it requires a level shifter in the buffer stage (if any). A design with all enhancement mode devices such as silicon NMOS can do the same but without a level shifter. With the addition of p-channel devices, e.g. Si CMOS, all polarities and all terms of Eq. (1) can be realized. As mentioned previously, a buffer stage is necessary for correct polarity of interconnections and fan out/fan in capacity.

Figure 6:
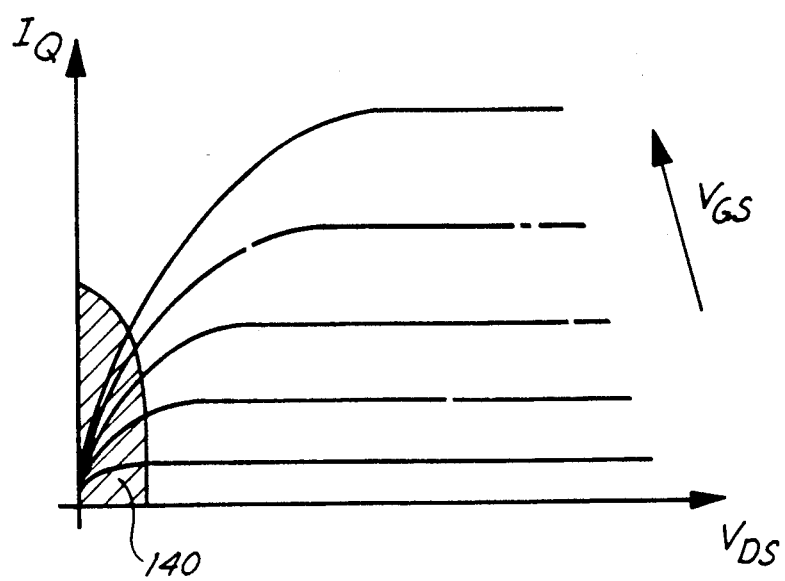
FIG. 6 is a graph of the current-voltage (I-V) characteristics of a typical FET.

The basis of the present design is the efficient implementation of shunting circuitry which is achieved by using the voltage-controlled conductance property of field-effect transistors when operated in the linear (below saturation) region. FIG. 6 shows the current-voltage (I-V) characteristics of a typical FET.

Operation of a FET in the linear (below saturation) region is described in PHYSICS OF SEMICONDUCTOR DEVICES, 2nd edition, John Wiley, 1985, by Sze, by the equation:

$$I_{DS} = K[(V_{GS} - V_{th})V_{DS} - V_{DS}^2/2], \text{ for } V_{DS} < V_{GS} - V_{th} \quad (3)$$

where $I_{DS}$ and $V_{DS}$ are drain-to-source current and voltages, respectively, $V_{GS}$ is gate-to-source voltage, $V_{th}$ is the threshold voltage beyond which the transistor does not conduct, and K is a transconductance parameter dependent on doping density, active layer thickness, and gate width to length ratio. This region of operation is also known to circuit designers as the variable-voltage resistance (VVR) range.

As seen in Eq. 3 the input current is proportional to the product of $V_{DS}$ and $V_{GS}$. It is this basic property that is used in the circuit of FIG. 1 to implement shunting networks. The reason is that it allows a "multiplication" to be performed with one transistor only. A more compact implementation would be difficult to achieve.

The quadratic term $V_{DS}^2$ in Eq. 3 can be ignored if $V_{DS}$ is small, or can be approximately cancelled by using other FETs of opposite type, such as p-type, in the upper rail 50 of FIG. 1. However, its presence is advantageous since it implements a shunting "self-excitation" term which contributes to the desired on-center off-surround anatomy of the network.

In the current saturation region, the transistor operates as a voltage controlled current source, and is modeled by $$I_{DS} = K(V_{GS} - V_{th})^2/2, \text{ for } V_{DS} > V_{GS} - V_{th}. \quad (4)$$

The basic principle described above is used by Petrie, in Practical implementation of nonlinear lateral inhibition using junction field-effect transistors, MSEE thesis, University of Washington, 1984, to implement multiplicative inhibitory networks. Designs for analog circuits using operational amplifiers of multi-transistor design, which perform multiplication but are based on a differential input signal, are known. They have been explained by Mead in A sensitive electronic photoreceptor, CHAPEL HILL CONFERENCE ON VLSI, pp. 463–471, 1985. Related circuits for the implementation of variable weights for possible inclusion in additive networks are described by Tsividis and Satyanarayana, in Analogue circuits for variable-synapse electronic neural networks, ELECTRONIC LETTERS vol. 23, No. 24, 1313–1314, 1989. Circuits for cancellation of the quadratic nonlinearity and extension of the multiplication range can be found in Czarnul, Design of voltagecontrolled linear transconductance elements with a matched pair of FET transistors, IEEE TRANS. CIR. SYS., vol. 33, no. 10, pp. 1012–1015, 1986.

By using equations (3) and (4) in the circuit diagram of FIG. 1, it is a straightforward matter to observe that in such a framework the general network equation (1) can be realized where $x_i$ is a positive definite variable and $K_{ij}$ and $K_{ij}$'s can be tailored during the fabrication process but are unalterable afterwards.

Shunting Non-Recurrent Circuitry

Equation (1) does not include non-recurrent terms of the form $x_i \Sigma I_j$. The circuit of FIG. 1 can be revised easily to accommodate these nonrecurrent, or feedforward, terms. The basic design is shown schematically in FIG. 7, where, for the sake of consistency, inputs are taken to be currents.

Figure 7:
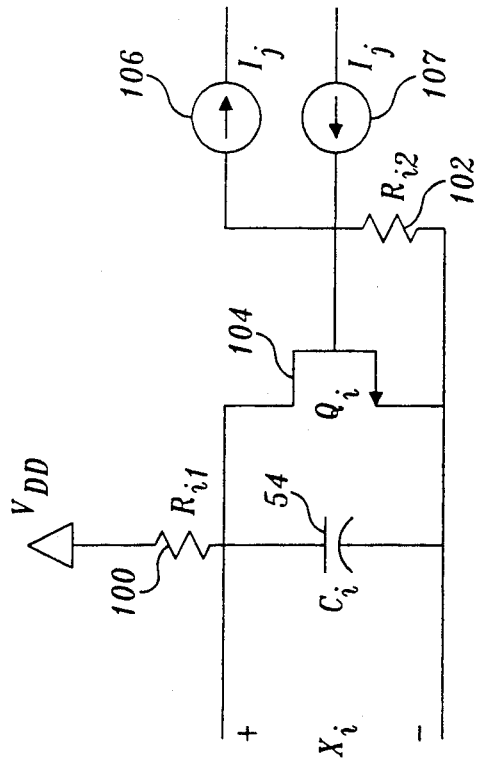
FIG. 7 is a schematic diagram of a basic design, where for the sake of consistency, inputs are taken to be currents rather than voltages.

In the circuit of FIG. 7, the resistor 100 is unnecessary if the circuit is included as part of the framework of FIG. 1. However, resistor 102 should be included for current-to-voltage conversion. The transistor 104 is assumed to be an n-channel enhancement mode FET. A depletion mode transistor can be used for $Q_i$ only if a level shifting operation is performed at a point prior to the input to the gate of $Q_i$.

Such a circuit implements the network equation $$\frac{dx_i}{dt} = \frac{V_{DD}}{R_{i1}} - a_i x_i + K_i R_i x_i(I_i) + \frac{K_i}{2} x_i^2 - K_i R_i x_i \left( \sum_{j \neq i} I_j \right). \quad (5)$$

Two problems are immediately evident in the design of the circuit shown in FIG. 7. First, the self excitatory current 106, which is shown as a current sink, is not easily implemented if it is the output of a current source such as a photodetector. Second, the term $R_i \Sigma_j I_j$ can easily exceed the threshold voltage of the transistor 104 and turn it off. The inhibitory current $I_j$ is provided by the current source 107.

Figure 8:
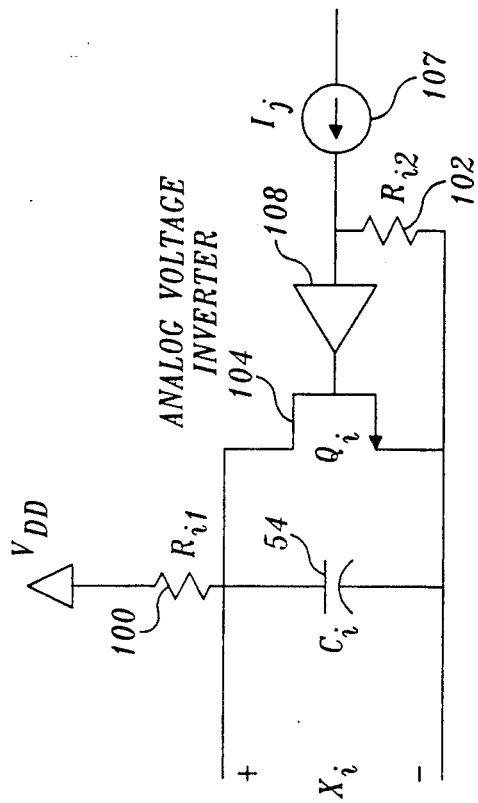
FIG. 8 is a schematic diagram of a design that can accommodate excitatory or inhibitory non-recurrent connections, where an analog inverter may be used to provide correct polarity and a depletion-mode transistor is chosen to simplify the design.

A design that can accommodate excitatory non-recurrent connections, and thus solve the first problem, is shown in FIG. 8. Here an analog inverter 108 provides correct polarity and the transistor 104 (which here is depletion-mode) simplifies the design. This circuit is described by the network equation $$\frac{dx_i}{dt} = \frac{V_{DD}}{r_{i1}} - a_i x_i + K_i R_i x_i(I_i) + \frac{K_i}{2} x_i^2. \quad (6)$$

The design of an analog inverter, however, is not trivial. However, since the inhibitory connections automatically provide a self-excitatory $x^2_i$ term as shown in Eq. 5, a circuit with only inhibitory terms should suffice for most applications.

Figure 9:
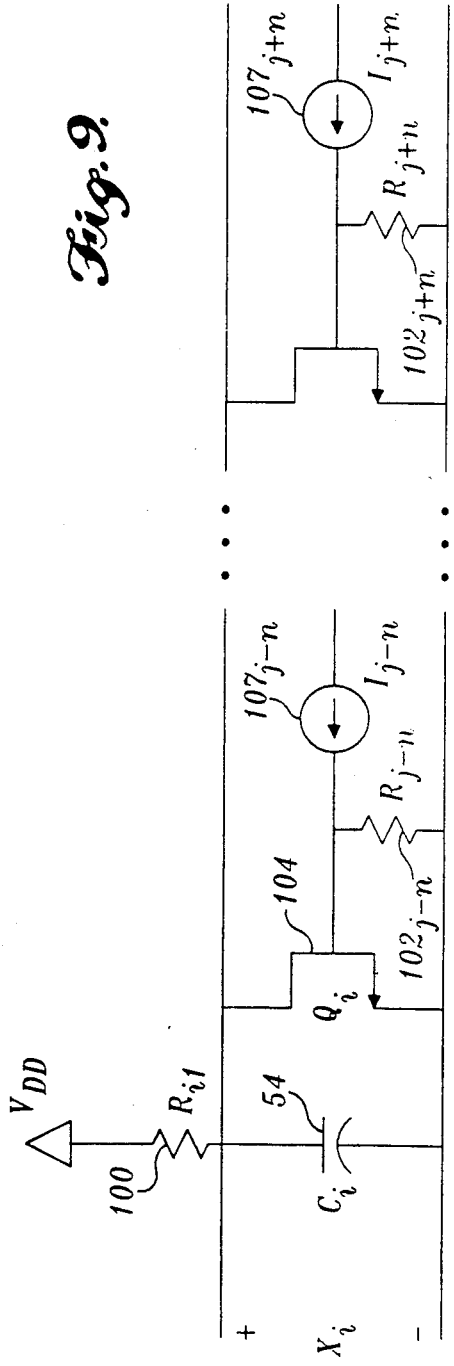
FIG. 9 is a schematic diagram of a circuit using one transistor per input source to gate currents.

The problem of exceeding the threshold voltage of the multiplying transistor 104 can be solved either by including a saturating nonlinearity after the summing circuitry, as will be shown later, or by using one transistor per input source to gate the currents, as shown in the circuit of FIG. 9. This circuit implements the network equation $$\frac{dx_i}{dt} = \frac{V_{DD}}{R_{i1}} - a_i x_i + \frac{K_i}{2} x_i^2 - x_i \left( \sum_{j \neq i} K_{ij} R_j I_j \right). \quad (7)$$

It also has the added advantage of selective hard-wiring of the connection strengths. Since the connection strengths are defined by $K_{ij}R_j$, they can be selectively hard-wired, i.e., the interconnection profile defined, by either varying the transconductance parameter or the resistor values.

A FULLY CONNECTED FEED FORWARD NETWORK

All of the designs that have been presented are adaptable to very high integration densities. This can be verified by examining the circuit of FIG. 10 where a cross-bar network of resistive elements 120 provides a fully connected interconnection matrix 122 for an array of input voltages 124 ($V_i$). Such resistive networks have been fabricated with a density of four resistors per square micron, by Graf et al. They described their work in VLSI implementation of a neural network with several hundreds of neurons, PROC. CONF. NEURAL NETWORKS FOR COMPUTING, American Inst. of Physics, 1986. Such networks have also been fabricated with switchable resistances at comparable densities. These networks are described by Thakoor, et al., in both Binary synaptic connections based on memory switching in a-H:Si, PROC. CONF. NEURAL NETWORKS FOR COMPUTING, American Institute of Physics, pp. 426-431, and Content-addressable, high density memories based on neural-network models: Jet Propulsion Lab, Tech Report JPL D-4166, 1987. The circuit of FIG. 10 adds 2N resistors 120, N transistors 104, and possibly N capacitors 54 to such resistive networks. This is accomplished without the need for any additional interconnect lines. Accordingly, it does not require much additional area.

Figure 10:
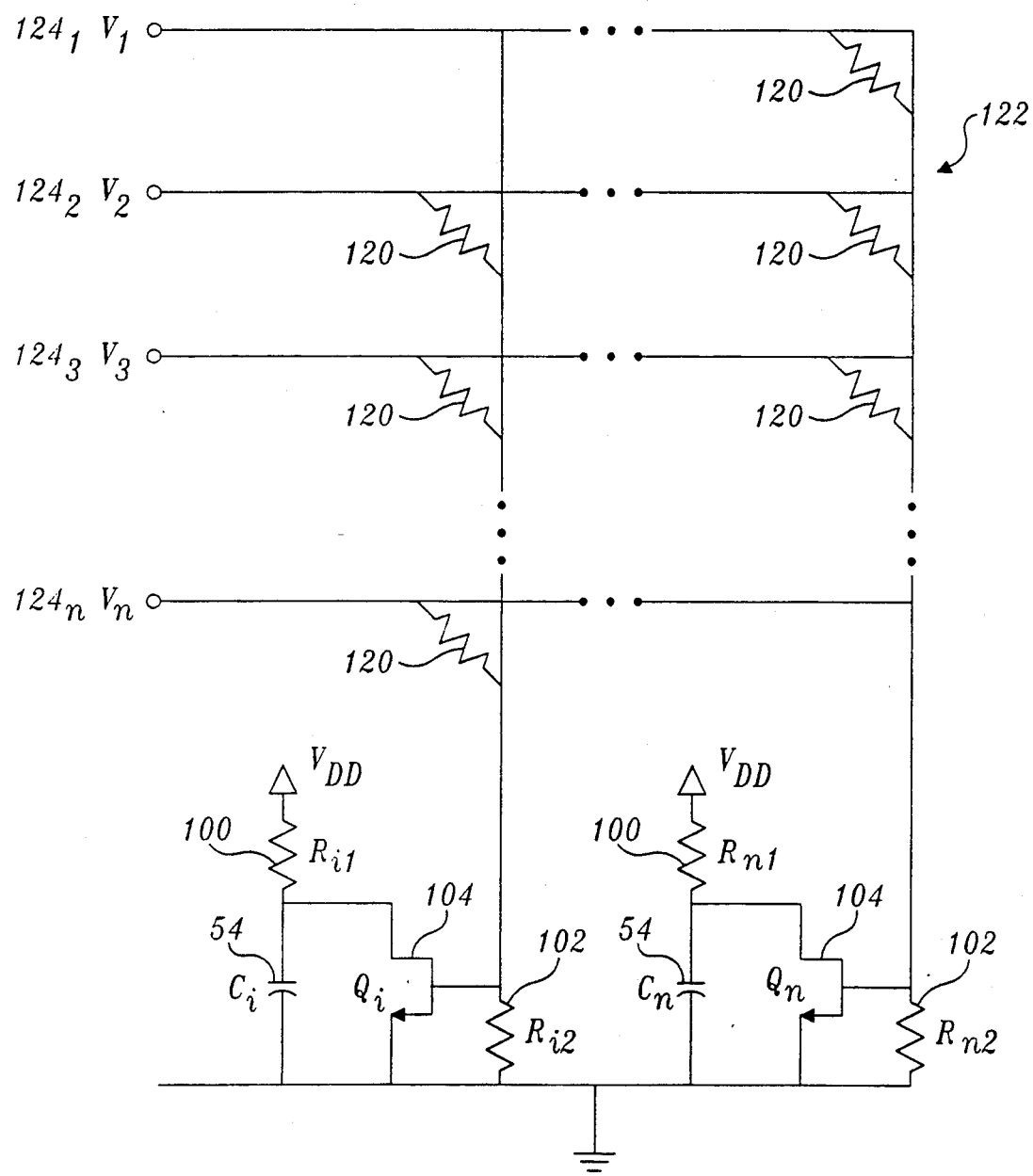
FIG. 10 is a diagram of a crossbar network of resistive elements providing a fully connected interconnection matrix for an array of input voltages.

The voltage presented to the gate of transistor 104 of the circuit in FIG. 10 can be found by noting that $$\sum_j \frac{V_j - V_{GS,i}}{R} = \frac{V_{GS,i}}{R_{i2}}, \quad (8)$$

where for simplicity it is assumed that all interconnect resistors 120 have the same value. This lead to $$V_{GS,i} = \frac{\sum_{j \neq i} V_j}{\frac{R}{R_{i2}} + N - 1}, \quad (9)$$

where N is the number of inputs connected to the cell i.

The total input presented to the cell i is thus divided by the denominator of Eq. 9 which is at least $(N-1)$, and can be further controlled by the choice of resistor ratio $R/R_{i2}$. (resistor 120 to resistor 102). Proper choice of this ratio allows a large dynamic range of the input to be processed by the cell.

If transistor 104 is operating in the linear region, output of the cell i is described by $$\frac{dx_i}{dt} = \frac{V_{DD}}{R_{i1}} - a_i x_i + \frac{K_i}{2} x_i^2 - x_i b_i \left( \sum_{j \neq i} V_j \right), \quad (10)$$

where $$b_i = \frac{1}{\frac{R}{R_{i2}} + N - 1},$$

and $$a_i = \frac{1}{R_{i1}} - K_i V_{th},$$

which is the desired shunting non-recurrent network equation. The above discussion shows that with existing technologies this circuit is capable of implementing a compact and fully interconnected shunting nonrecurrent neural network.

Summing Circuitry and Excitatory and Inhibitory Connections

In the circuit of FIG. 1 summation is performed by using Kirchoff's current law, which arises from the principle of conservation of charge. Accordingly, the summation is valid with unlimited precision for the lumped circuit. The distinction between excitatory and inhibitory connections is then basically determined by the direction of current flow in that circuit.

As mentioned previously, and discussed in detail for nonrecurrent networks, implementation of the multiplicative excitatory connections requires an analog inverter, and for most applications is better provided by the quadratic self-excitatory terms which are due to transistor nonlinearities and are provided cost-free by the shunting inhibitory connections.

Furthermore, often the cell activity $x_i$ (state 57$_i$) should accept both positive and negative values, corresponding to the depolarization and hyperpolarization of biological neurons. When $x_i$ changes sign, the excitatory terms become inhibitory and vice versa. It is for this reason that the excitatory terms appear in the network equations and contribute to the stability of the network. In the implementations discussed, the cell activity is assumed to be positive and hence the implementation of excitatory terms is not as important.

Nonetheless it is important that the excitatory shunting terms can be implemented because in some applications the profile of the receptive field which is mainly described by the anatomy of the dendritic arborization, i.e., the ratio of excitatory to inhibitory interactions, is crucial. Also, it is believed that in learning the excitatory connections are modified while the inhibitory ones remain constant, and hence provision for excitatory interaction should be made.

Sigmoidal Nonlinearity

Figure 11:
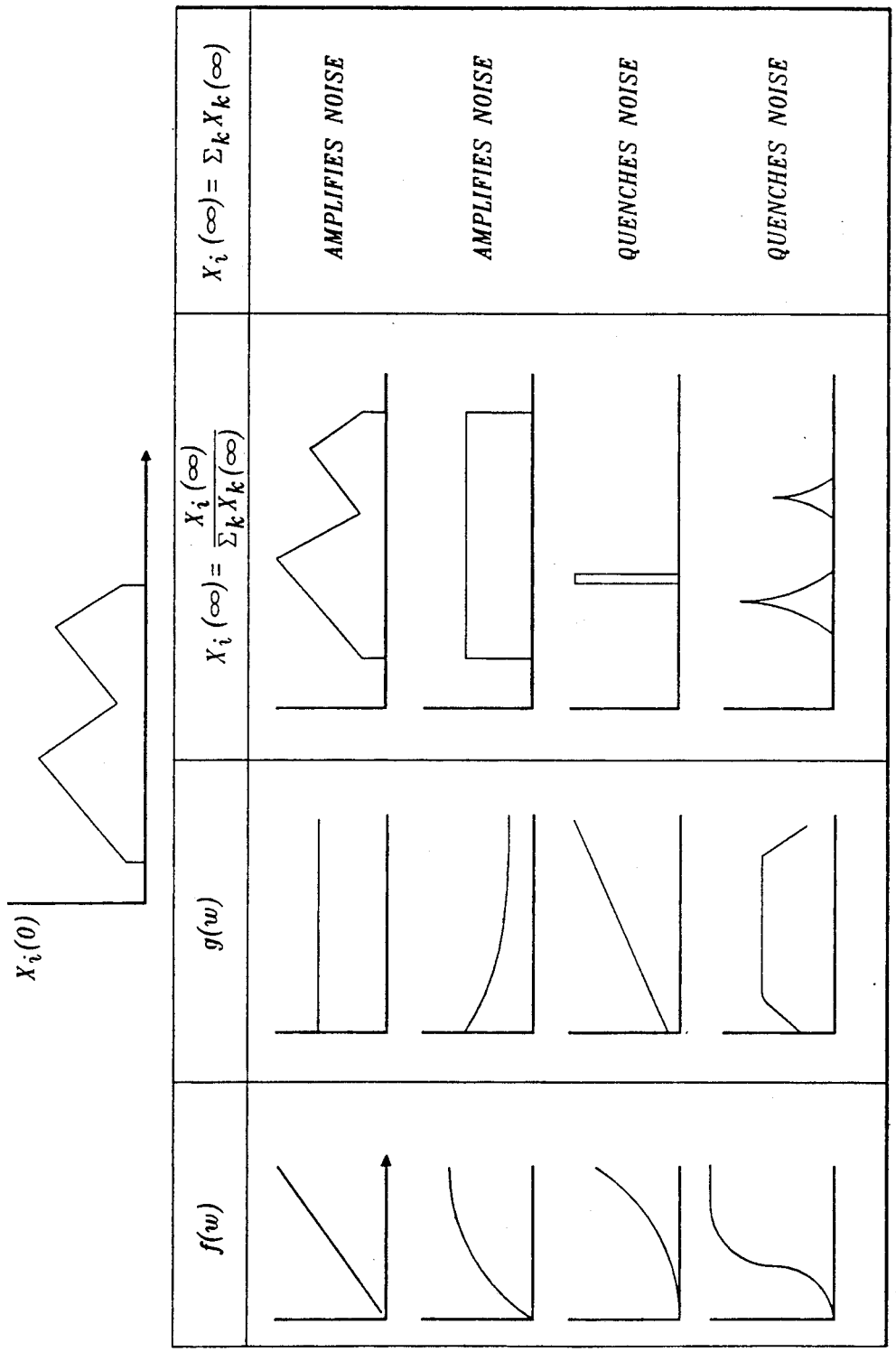
FIG. 11 is a schematic categorization of the effect of the feedback nonlinearity on processing of the input data.

The shape of the nonlinearity in the feedback loop, i.e., the shape of $f(x_j)$ in a network such as, but not limited to, $$\frac{dx_i}{dt} = -ax_i + (B - x_i)[I_i + f(x_i)] - x_i \left[ J_i + \sum_{j \neq i} f(x_j) \right] \quad (11)$$

has special significance. It has been shown, by Grossberg, in his 1973 paper, that if $f(x_i)$ and $f(x_j)$ is sigmoidal or S-shaped, it can suppress noise, contrast enhance suprathreshold activities, and normalize total activity. A sigmoidal signal implies the existence of a threshold, a quenching threshold as termed by Grossberg, below which activity is identified with storage, which activity is contrast enhanced. This transformation is identified with storage in short term memory (STM). FIG. 11 categorizes the effect of the feedback nonlinearity on processing of the input data.

Figure 12A:
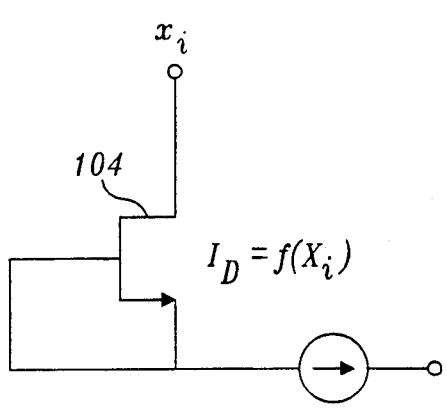
FIGS. 12a and 12b are schematic diagrams of designs which use a saturating nonlinearity wherein both the slope and the saturation point are easily controllable by the gate-to-source voltage, this natural property performing a desired transformation.
Figure 12B:
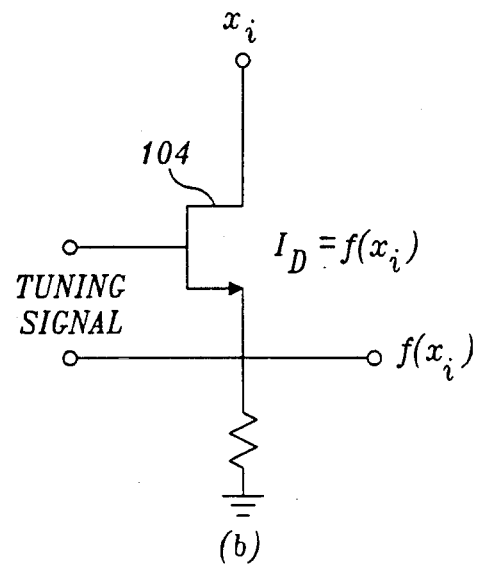

Sigmoidal nonlinearities occur naturally in electronic devices. The I-V curves of a single FET as shown in FIG. 6 provide an excellent example of a saturating nonlinearity. In this nonlinearity, not only the slope, but also the saturation point is easily controllable by the gate-to-source voltage. However, the slope and saturation point are not controllable independently. Reducing one reduces the other. The hatched region 120 of FIG. 6 is the multiplication region of the characteristic curves. FIG. 12 shows two designs which use this natural property to perform the desired transformation.

Since at low values of $x_i$, $f(x_i)$ is linear, such a circuit will amplify both signal and noise for low values of signal. If a faster-than-linear transformation is needed for low values of signal, i.e., a true sigmoidal curve, other circuits such as differential amplifier pair, which is described by a hyperbolic tangent (tanh) may be employed. The choice depends on the application and for the present purposes the simplest implementation seems the most appropriate.

This design offers a very simple solution to a complicated and important problem; the simplicity of the design thus should not disguise its elegance.

Interface Circuitry

The large fan-in and fan-out associated with high connectivity neural networks and the importance of the polarity of the output necessitates a carefully chosen buffer stage.

If p-type or depletion mode devices are used in the basic cell diagram of FIG. 1, a level shifter is necessary for correct polarity. Implementation of excitatory connections requires an analog inverter.

Since the output of each cell connects to the gate of the other cells, which is a reverse biased diode, little current is drawn by fan-out connections (under steady state) and a design with only enhancement mode devices may be implemented even without a buffer stage.

Since each connection from other cells of the network provides a resistive path in parallel with the cell membrane resistance, fan-in considerations require careful determination of the amount of current flow per cell. The designs discussed are readily applicable for sensory networks which usually do not require very high connectivity.

The Choice of Technology

The basic cell of FIG. 1 is very similar to a standard logic gate inverter made with transistors sized to operate in the nonsaturated current region. Appropriate sizing is specified in terms of the gate width-to-length ratio. Thus, the designs discussed can be implemented in a variety of field effect transistor technologies including NMOS, CMOS, and gallium arsenide (GaAs).

A circuit made entirely from depletion-mode devices such as GaAs MESFET buffered FET logic can implement most of the terms of Eq. 1. The exception is the shunting excitatory terms which require a level shifter in the buffer stage. A design made entirely from enhancement-mode devices such as silicon NMOS can do the same but without a level shifter. With addition of p-channel devices, e.g. Si CMOS, all polarities and all terms of equations described can be realized. For this case, as mentioned previously, a buffer stage is necessary for sufficient fan-out.

Gallium Arsenide Framework

From the previous discussion it is evident that all the FET technologies can be used for the implementation of shunting neural networks. Silicon-based technologies are highly developed and have accumulated a very wide library of available designs and uses as well as highly efficient processing technologies. Gallium arsenide, on the other hand, has several long-term advantages relevant to the present application.

One of the advantages is that gallium arsenide has a higher transconductance per unit gate width than silicon. Thus, it can offer higher frequency/bandwidth operation. It is also capable of operating at high temperatures and is highly radiation tolerant. Since GaAs is a direct bandgap semiconductor, it is capable of efficiently emitting photons. Examples of efficient photon emittors are injection lasers and light-emitting diodes. An example of an efficient photon detector is a photodiode. Both detectors and emitters, in addition to electronic circuitry, can be monolithically integrated on the same substrate, constituting optoelectronic integrated circuits (OEICs). Gallium arsenide also has larger piezoelectric, electro-optic, and electroabsorptive coefficients than silicon.

A capability unique to gallium arsenide raises the possibility of bandgap engineering with other compound semiconductors as demonstrated by fabrication of heterojunctions, quantum wells and superlattices. Devices based on such structures offer extraordinary properties whose relevance to neural network applications may provide a fertile ground for future research. A design that uses this unique property by employing epitaxially grown aluminium gallium arsenide (Al-GaAs) on a gallium arsenide substrate is presently under study.

On the negative side, gallium arsenide based devices suffer from several deficiencies which should be considered in the choice of the implementation medium. Silicon can form a native stable oxide with an atomically clean interface which is used in making metal-oxide-semiconductor FETs (MOSFET). The MOSFET gate can then be biased with either polarity. The metal semiconductor gate FET (MESFET), on the other hand, is the device of choice for gallium arsenide technology. The reason is that GaAs does not have a stable native oxide.

The gate of a MESFET is a Schottky diode which should not be forward biased. It is for this reason that enhancement-mode devices are difficult to fabricate in GaAs technology, and hence the designs should primarily consist of depletion-mode devices. The limited voltage range of enhancement-mode devices is probably the most constraining for the implementation of neural networks; however, the circuit designs discussed have countered this problem by suggesting inverter and level-shifter circuitry.

Also, in gallium arsenide, electrons are much more mobile than holes and thus p-channel devices require much greater area compared to n-channel devices of the same characteristics. Hence, GaAs circuits normally use only n-channel devices. Even in n-channel devices the control of the threshold, and hence the pinch-off, voltage poses a sensitive fabrication problem since it is defined by $$V_p = \frac{qN_d a^2}{2\epsilon} \quad (12)$$

where $V_p$ is the pinch-off voltage, $N_d$ is the majority carrier (donor) density, a is the active layer thickness, and q and e are magnitude of electronic charge and semiconductor permittivity, respectively.

This relation shows that since high speed operation and large current drive requirements are met by a high density of the majority carriers, the product $N_d a^2$ which determines the pinch-off voltage is very sensitive to active layer thickness which in turn requires strict control of both the growth and etching of this layer. This problem is somewhat alleviated by the fact that for analog neural network implementation, FETs should operate in the linear region and hence a large pinch-off voltage is desirable, which reduces the precision requirements of the active layer thickness. Interestingly, the speed of operation is not sacrificed since the feedback mechanism of shunting nets, as described above, automatically limits the voltage swing and the transistor operates in a "small-signal" regime rather than having to turn on and off.

The last consideration in device technology trade-offs is that the high speed of GaAs circuits requires low loss conductors and hence interconnections require larger areas, which in turn increases parasitic nodal capacitances. Parasitic capacitances should be minimized by reducing the cross-sections of the interconnect lines and the line-to-line capacitances. These are often contradictory goals.

The choice of technology, like most other engineering problems, requires a careful study of the trade-offs as applied to a specific problem. An important feature of the present designs is that they apply to all of the FET-based technologies, but based on the above-mentioned trade-offs, silicon technologies are better suited for purely electrical applications of neural networks and offer the short-term advantages of available functionalities and streamlined fabrication facilities. For optoelectronic applications, GaAs and other compound semiconductors have very promising long term advantages. The final verdict can be made when the unique capabilities of each technology is employed and optimized. The latter goal as an extension of this project is presently under study.

SPECIFIC IMPLEMENTATION

Figure 13:
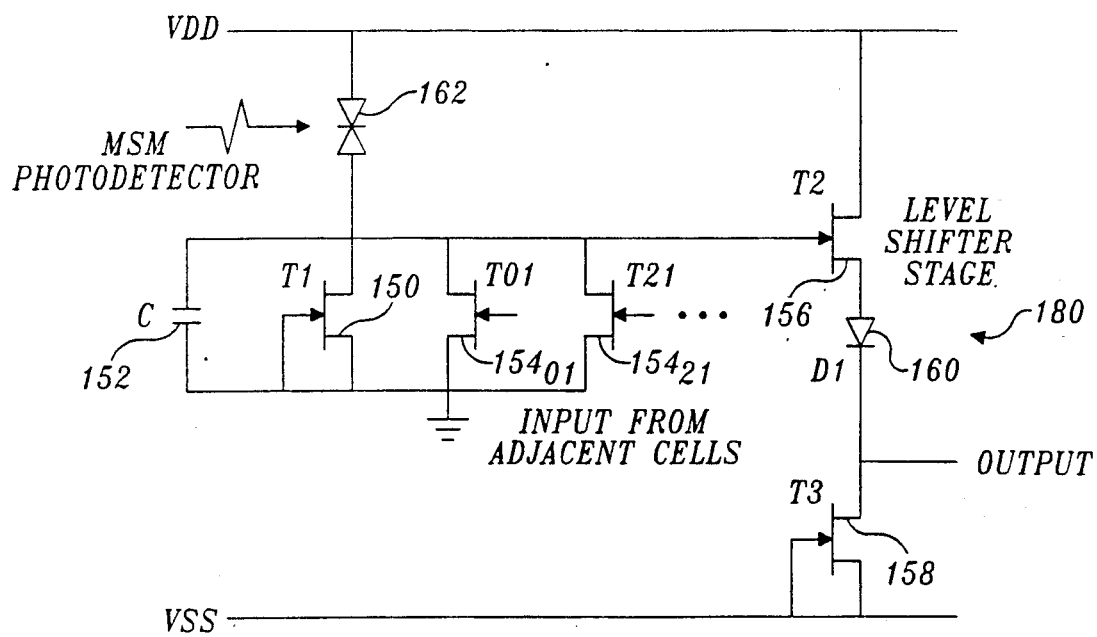
FIG. 13 is a schematic diagram of the simplest shunting recurrent network that can be implemented using d-mode FETs and within the design framework of FIG. 1 and demonstrates the desired properties of shunting networks.

The simplest shunting recurrent network that can be implemented within the design framework of FIG. 1 and also demonstrates the desired properties of shunting networks is shown in FIG. 13. This network implements the network equation.

$$\frac{dx_i}{dt} = I_i - a_i x_i + K_i x_i^2 - x_i \sum_{j \neq i} f_j(x_j). \quad (13)$$

The circuit of FIG. 13 was implemented using depletion-mode junction field-effect transistors (JFETs), such as Motorola MPF102 depletionmode JFETs, due to their almost identical characteristics with gallium arsenide MESFETs. This implementation thus serves as a design precursor to a GaAsbased monolithically integrated circuit implementation of an optically sensitive network, and as a vehicle for testing the design principles and circuits presented in this specification.

The simplicity of the design should be stressed, since in this realization:

Each "neuron" consists of only one resistor (transistor 150), in parallel with a cell capacitance 152 (C).

Each multiplicative coupling is done by one transistor 154$_{ij}$ (T$_{ij}$).

Transistors 156 and 158 and diode 160 form a level shifter which is necessary for correct voltage level interfacing in depletionmode technology but not required when using enhancementmode devices.

Input can be directly supplied with one metal-semiconductormetal (MSM) photodetector 162. In the discrete circuit implementation one transistor, with a variable resistor applied to its gate and source terminals, was used as current input.

A two-dimensional matrix with four nearest neighbor interconnections will then consist of only seven transistors (150, 156, 158, and four copies of 154$_{ij}$), one to three diodes 160 (depending on the amount of level shifting required and the turn-on voltage of the diodes) and, if desired, one capacitor 152 per cell. The compactness of the design is notable in comparison with the implementations described previously.

A circuit consisting of seven cells with nearest neighbor connections has been constructed. The following describes important design considerations and the experimental results described subsequently were obtained from this implementation.

Accuracy

The present implementation depends upon the operation of a FET in the linear region. Accordingly, it is important to verify the validity and accuracy of the mathematical model of this operation, as given in Eq. 3, which is repeated here $$I_{DS} = K[(V_{GS} - V_{th})V_{DS} - \tfrac{1}{2}V_{DS}^2], \quad (14)$$

for $V_{DS} < V_{GS} - V_{th}$.

Also, often in modeling the operation of a FET in the linear region, the quadratic term in Eq. 14 is often ignored and the transistor is modeled as a linear voltage-controlled conductance. Since such an assumption directly alters the network equations, its validity should also be experimentally established.

The device-dependent parameters K and $V_{th}$ in Eq. 14 were extrapolated from experimental data and used in linear and nonlinear models of a transistor. Comparison of the models with experimental data is shown in Table 1, where R (non-linear) is a theoretically calculated resistance, using Eq. 14, and R (linear) is calculated by ignoring the quadratic term.

TABLE 1

| Comparison of the linear and nonlinear models of a FET for operation below saturation. | | | | | |
|---|---|---|---|---|---|
| VGS | R (measured) | R (linear) | % error | R (non-lin.) | % error |
| 0.0 | 343 | 300 | 12.5 | 343 | 0.0 |
| −0.2 | 468 | 368 | 21.3 | 468 | 0.0 |
| −0.4 | 625 | 477 | 23.09 | 585 | 6.4 |
| −0.6 | 1000 | 678 | 32.0 | 858 | 14.2 |
| −0.8 | 1875 | 1172 | 37.0 | 1611 | 14.0 |

Table 1 shows that ignoring the quadratic term produces an average error of 25 percent. On the other hand, including this term results in a much lower average error of 7 percent. For this reason, the model of Eq. (14) will be used throughout this work.

This experiment also implicity shows the accuracy of the performed multiplication and is better demonstrated by the following experiment.

The simplest tractable network equation can be found by applying the output of a cell to itself. This is mathematically equivalent to the application of a uniform input to an arbitrarily large array of identical neurons and hence does not constitute a trivial example. Such a system is described by $$\frac{dx_i}{dt} = I - ax_i + K_1x_i^2 - K_2x_ix_j, \quad (15)$$

where $x_i = x_j$ for all $j$.

This equation has a straightforward steady-state analytical solution which can be compared with experimental data to show the accuracy of the model. This solution provides a signal-to-noise ratio measure of precision of the "multiplication" as well as the network equations implemented.

Figure 14:
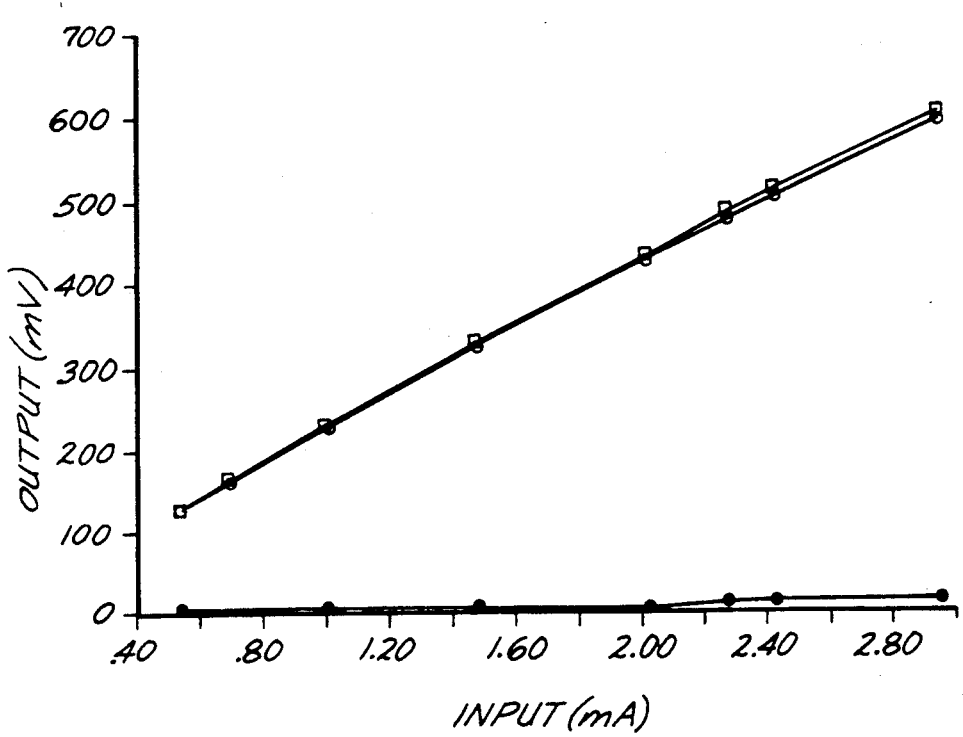
FIG. 14 is a graph of the response of a cell with self-inhibition, comparing experimental and theoretical results, and showing the accuracy of the implementation.

Table 2 shows the result of such a comparison. The data is also plotted in FIG. 14, which is a graph of the response of a cell with selfinhibition, comparing experimental and theoretical results, and showing the accuracy of the implementation.

TABLE 2

Comparison of the theoretical and experimental response of one cell with cell-inhibition to establish accuracy of the implementation.

| Input | X (Theory) | X (Measured) | Error | % Error |
|---|---|---|---|---|
| 0.54 | 126.3 | 130 | 3.7 | 2.80 |
| 0.70 | 161.6 | 165 | 3.4 | 2.06 |
| 1.01 | 227.8 | 233 | 5.2 | 2.23 |
| 1.48 | 323.1 | 329 | 5.9 | 1.79 |
| 2.02 | 426.1 | 430 | 3.9 | 0.91 |
| 2.43 | 500.4 | 510 | 9.6 | 1.80 |
| 2.95 | 590.5 | 601 | 10.5 | 1.75 |

Table 2 shows that the equations implemented are accurate to within an average error margin of 1.89%.

Another figure of merit that helps put the accuracy of the implementation in relative perspective is found by noting that the 1.89% average error can be treated as quantization error of a corresponding digital system. A six-bit digital code produces roughly the same average error if the output falls within the range (1–64) that can be coded by six bits. However, the range of the output, and input, far exceeds (1–64) and a digital system which is capable of addressing even the limited range of Table 2 requires at least 9 bits to represent this range. Based on these considerations, a digital 8-bit machine would be needed to perform the computation reported in Table 2 with equal accuracy.

Level-Shifting and the Dynamic Range

Figure 15:
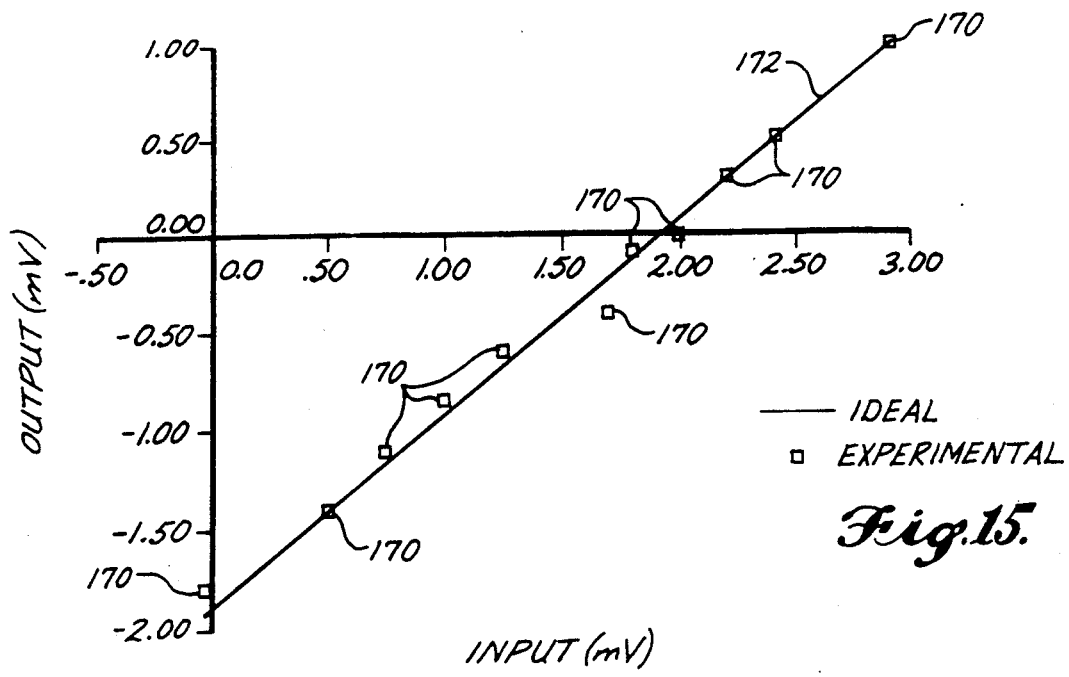
FIG. 15 is a graph of experimental results of a level-shifting stage with three diodes.

Transistors 150 and 156 and the diode 160 in FIG. 13 perform the operation $$V_{out} = V_{in} - V_{LS} \quad (16)$$

which shows that the output is a version of the input shifted by the amount $V_{LS}$. Accordingly, this circuit is called a level-shifter. Experimental results of a level-shifting stage with three diodes (e.g., Motorola 1N4007 diodes), is shown in FIG. 15, where it is seen that the output (points 170) is described by $$V_{out} = V_{in} - 1.90 \quad (17)$$

in agreement with Eq. 16 (curve 172).

The amount of level-shifting is only a function of the turn-on voltage of the diode 160 which can be increased, up to the negative supply rail voltage, by adding more diodes in series, or custom designing diodes with required turn-on voltages during integrated circuit design. This amount is a crucial design parameter since it establishes the dynamic range of operation, as explained below.

The output of the level-shifter ($V_{out}$) is applied to the gate of the depletion-mode transistors $154_{ij}$ (See FIG. 13) of other cells in the network. It also controls the conductance of these transistors. The level-shift voltage should thus be smaller than voltages that may cause excessive current flow by forward-biasing these gates. On the other hand, $V_{out}$ (across capacitor 152) is lower-bounded by the threshold voltage of the transistors $154_{ij}$. The reason is, if the output is reduced below the threshold voltage, the conducting transistor channel will be completely pinched-off and the transistors $154_{ij}$ will act as open circuits. Since the voltage of each cell is the input current multiplied by the equivalent resistance encountered by the current, the elimination of a parallel conduction path increases the resistance and thus the cell voltage disproportionately. This error is more significant for networks with fewer interconnections.

From the above discussion, the level-shifting amount should be chosen within the range $$V_{th} \leq V_{LS} \leq V_{up}, \quad (18)$$

where $V_{up}$ is a positive quantity, typically a few tenths of a volt and $V_{th}$ is the negative valued threshold voltage. Furthermore, in this range an operating point which maximizes the possible conductance swing is optimal.

In the circuit of FIG. 13, the threshold voltage of the transistors was determined to be 1.5 volts. Thus one diode 160 with a turn-on voltage of about 0.6 volts was chosen to provide the optimal level-shifting amount.

Finally, in addition to providing correct polarity, the level-shifter stage (180) performs an important interfacing role. Since the input to the level shifter is applied to the gate of transistor 150, a reverse-biased diode for MESFETs, this stage does not draw any significant current. Accordingly, the stage practically isolates the output of a cell from other cells it is connected to and allows a large fan-out to be achieved.

The allowed range of the input, on the other hand, is dependent on the input resistance and is determined by the pinch-off voltage of the transistors. This can be demonstrated by an example.

Consider a cell with the typical electrical device membrane resistance of 400 ohms, connected to four neighbors. The highest resistance seen by such a cell occurs when all the interconnect transistors have their highest resistance value, which occurs for $V_{GS} = V_{th}$. For the transistors used, this highest resistance equals 2 kiloohms, and hence the equivalent resistance is 500 ohms (=2 kiloohms/4). The cell voltage, which is the drain-to-source voltage of parallel transistors, is found from $$x_i = I_i \times R_{eq} \quad (19)$$

and should remain in a below saturation region. For a long channel resistor this range is a few volts and hence the input $I_i$ in (19) can range up to 10–15 milliamperes.

Even if the input current exceeds this range, the network remains stable. The shunting interaction is replaced by an additive interaction for the specific cell. The interaction is due to its high activity which strongly inhibits its neighbors and forces them deeper into below-saturation operation. In practice, power dissipation requirements determine the upper-bound for current flow in the network.

As seen from this qualitative treatment, the higher the degree of interconnection, the larger the dynamic range within which the input can be processed. The allowable lower bound of the input is determined by the sensitivity of the devices and, ultimately, by the noise immunity of the technology. With present technology it seems quite feasible to process several orders of magnitude of the input current (from high nanoamps to low milliamperes) with the networks presented. The very wide dynamic range achieved from a limited dynamic range of each unit is a good example of the power of the collective behavior of neural networks.

Response to Uniform Input

As mentioned previously, the response of a network of identical cells to a uniform input can be deduced from the response of one cell to a single input since a uniform input is only characterized by an intensity level without any contrast, or pattern. A uniform input response is thus significant in demonstrating the intensity-dependent properties of networks.

Figure 16:
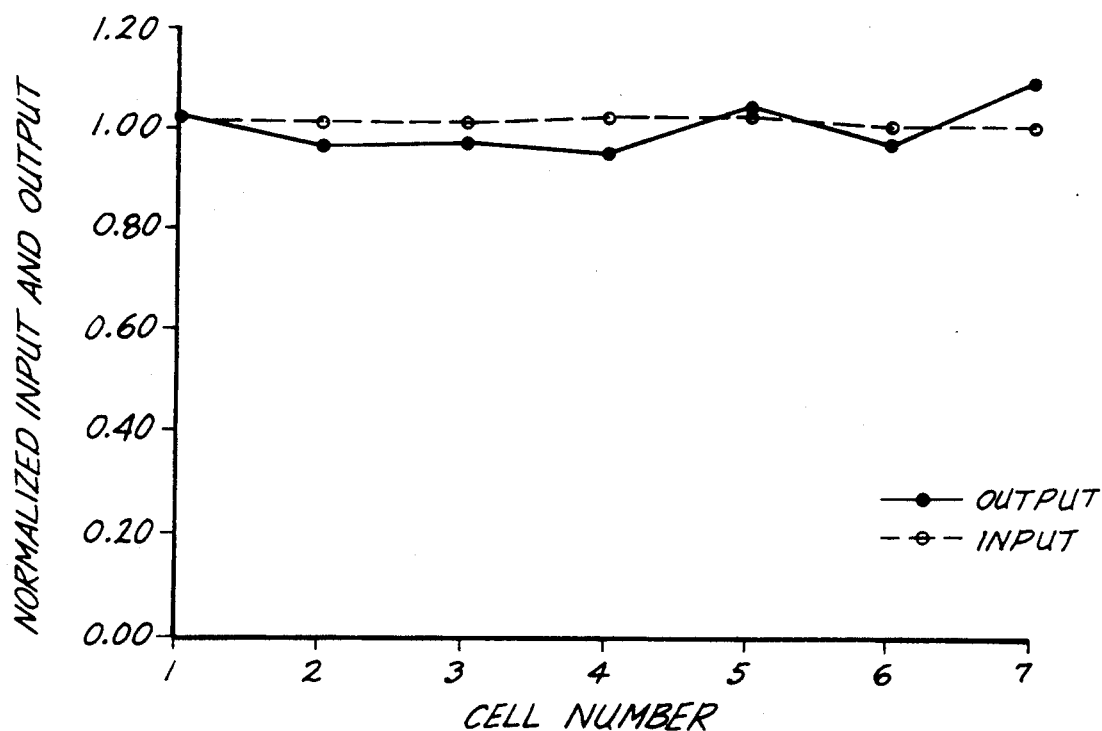
FIG. 16 is a graph of the response of a network to a uniform input, showing that the variation across the array is mainly due to component variation.

FIG. 16 shows the response of a network of nearest neighbor-connected cells to a uniform input and is seen to be acceptably uniform across the array, as expected. The noise that is observed in this experiment can be explained by the device variations across the array. The voltage across the simple level-shifter stage, which only consists of two transistors 156 and 158 and the diode 160, varies by up to 68 millivolts across the array. Table 13 shows this to be the case, while the uniform input response varies by at most 17 millivolts across the network. Furthermore, the abrupt boundary at the ends of the array of cells influences the network response and produces errors which should be accounted for. In all of the experiments, a constant load was added to cells one and seven in each of the experiments to compensate the abrupt boundary. More sophisticated techniques were employed for cases where boundary effect cancellation was crucial and will be shown as they are encountered in the following description.

TABLE 3

Variation of the level-shifting stage across the array due to device variations.

| Cell Number | 1 | 2 | 3 | 4 | 5 | 6 | 7 |
|---|---|---|---|---|---|---|---|
| Level Shifting Amount | 596 | 657 | 632 | 616 | 665 | 620 | 651 |

Having established that the uniform input response can be found from the response of one cell to an input, from equation (15), it is seen that the response of the network to a uniform input is proportional to the square root of the input. However, the response is also a function of the parameters $K_1$ and $K_2$ which are dependent on the membrane resistance and transconductances of the devices, respectively. FIG. 16 shows the response to a uniform input. This response is close to a linear function. However, the response can be tuned, by a different choice of $K_1$, to emphasize the square root dynamic range compression. The mechanism and uses of this tuning process will be discussed subsequently.

Figure 17:
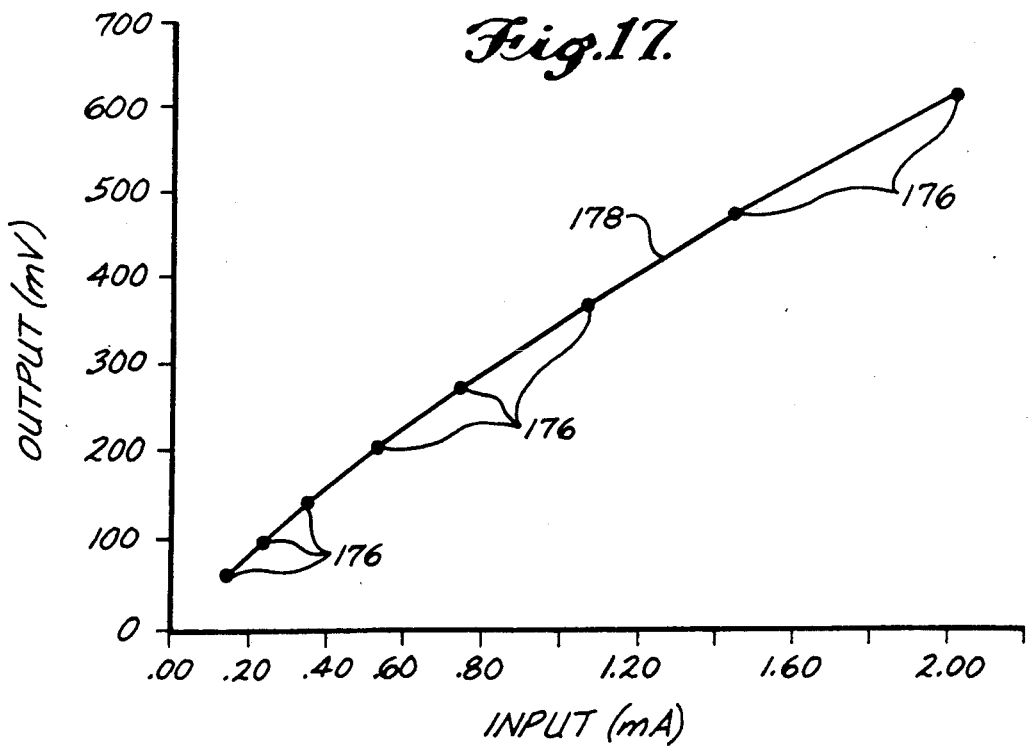
FIG. 17 is a graph of the theoretical steady state response of a network consisting of three fully interconnected cells, where the coefficients are chosen to demonstrate the dynamic range compression property, showing the square root compression of the input range.

FIG. 3 shows the behavior of an actual implementation, when the membrane resistance value is chosen to better reflect the desired saturating characteristics of the network. It compares the measured responses (points 176) to the theoretical response (curve 178), showing good agreement. This behavior is more pronounced when the neural network equations above are analyzed independently of the implementation constraints. FIG. 17 shows the theoretical steady state response curve 180 of a network, as predicted by a theoretical analysis to be presented subsequently. The network consists of three fully interconnected cells, where the coefficients $K_1$ and $K_2$ are chosen to better demonstrate the dynamic range compression property.

Range Compression and Data Compression

FIGS. 3 and 17 show the dynamic range compression beyond the sensor layer which, for many biological systems, has already performed a logarithmic transformation of the input. The significance of the range compression property is seen by noting that the human retina, for example, is sensitive to an input range of $1-10^{13}$ luminance units (as described by Levine, in VISION IN MAN AND MACHINE, McGraw-Hill, 1985). The firing range of the ganglion cells, whose axons form the optic nerve, is 1–200 spikes per second. The firing range is further reduced by the presence of intrinsic noise. Compressing the dynamic range of the signal beyond the photoreceptor layer may be essential in achieving such a wide dynamic range of sensitivity without saturating the processing power of each cell.

This property has immediate technological applicability. For example, available photodetector imaging technologies such as charge coupled devices (CCD) arrays cannot compare with the sensitivity range of the biological systems without the attendant degradation caused by blooming, ghosting, or minimum charge transfer sensitivity.

Range compression, however, is of little value if it is not concomitant with other processing capabilities, and especially if "important features" of the data are not preserved. The following observations lead to the conjecture that the network performs data compression in the information theoretic sense of the reduction of redundancy and not simply range compression.

Spatial edges, or areas of contrast, contain the most information. On the other hand, uniform areas contain little information because they are predictable. The inventors have a great deal of experimental data to support the conclusion that the network contrast-enhances the input while attenuating uniform areas. In general, an excitatory center-inhibiting surround receptive field configuration automatically decreases redundancy via transduction of the spatial differences. However, this configuration may also introduce unacceptable distortion.

The auto-correlation function of the output of the excitatory center-inhibiting surround reception field tends to be narrower than that of the input; i.e., the output is less correlated than the input. That is, the output is less correlated than the input. Accordingly, the output contains more independent data points and more information than the input. This is a crucial test but needs to be verified by a larger pool of neurons.

The experimental data of the discrete implementation is very similar to the measurements of insect visual cells which gave rise to the hypothesis that the peripheral visual system performs a predictive coding of the input data resulting in the removal of redundancy. The measurements of insect visual cells were described by Srinivasan et al., in Predictive coding: a fresh view of inhibition in the retina, PROC. R. SOC. LOND., 216, pp. 427–459, 1982. Shunting networks can mediate the same process, which is derived from predictive coding. They are also capable of providing many other properties that cannot be explained by a predictive coding hypothesis. This should be verified by using a larger number of neurons. Such verification is a goal of the integrated circuit implementation.

Data compression, if rigorously established, is only one feature of a shunting network, rather than its main purpose. Maximum entropy coding techniques, cost functions, and error criteria, as well as other conventional processing techniques can act as comparative measures of performance for specific tasks. However, neural network theory is distinct from and more general than any single conventional hypothesis.

Point Source Response

As suggested previously, the response of a neural network to a point source input is important in characterizing the behavior of the network, similar to the manner in which the impulse response characterizes the behavior of a linear system. There are, however, distinct differences. The temporal impulse response, or the spatial point-source response, completely specifies the reflective temporal or spatial properties of a linear system and its Fourier transform provides the temporal frequency transfer function, or the spatial frequency modulation transfer function of the system. This function completely specifies the system's frequency domain properties; the same principles do not apply to nonlinear systems such as the shunting networks. At a minimum, linearization of the system about a parameter (such as mean input level) is required.

The point-source response can be assumed to specify the "receptive field" of a stimulus. This assumption requires some clarification, especially since the results will be compared to the receptive field of biological cells.

The phrase "receptive field" was coined by Hartline in 1940, in The receptive field of optic nerve fibers, AMERICAN JOURNAL OF PHYSIOLOGY, 130, pp. 690–699. Hartline solved the problem of dissecting a nerve bundle in the retina of the frog and noted that no description of optic responses in single fibers would be complete without a description of the region of the retina that must be illuminated in order to obtain a response in any given fiber. Hartline called this region a "receptive field." A receptive field is thus a map of the spatial sensitivity of a cell to stimulus. Classic works by Kuffler (Discharge pattern and functional organization of the retina, J. NEUROPHYSIOL, 16, pp. 37–68, 1953), Hubel and Wiesel (Receptive fields of single neurons in the cat's triate cortex, J. PHYSIOL. 148, pp. 574–591, 1959), and Barlow et al. (Retinal ganglion cells responding selectively to direction and speed of image motion in the rabbit, J. PHYSIOL. 173, pp.477–504, 1964) carefully described the shape of the receptive field of the cat ganglion cells, the cells in the lateral geniculate nucleus of that cat, and rabbit ganglion cells, respectively, which helped explain the response of these cells to different stimuli.

On the other hand, a stimulus such as a narrow spot of light invokes a pattern of activity across the cells; it excites cells on whose on-center it has fallen and inhibits those whose off-surround receptive field contain the stimulus. This pattern of response specifies the receptive field. Such a pattern is strictly valid when the cells have identically designed receptive fields. This is the case for the present implementation.

Figure 18:
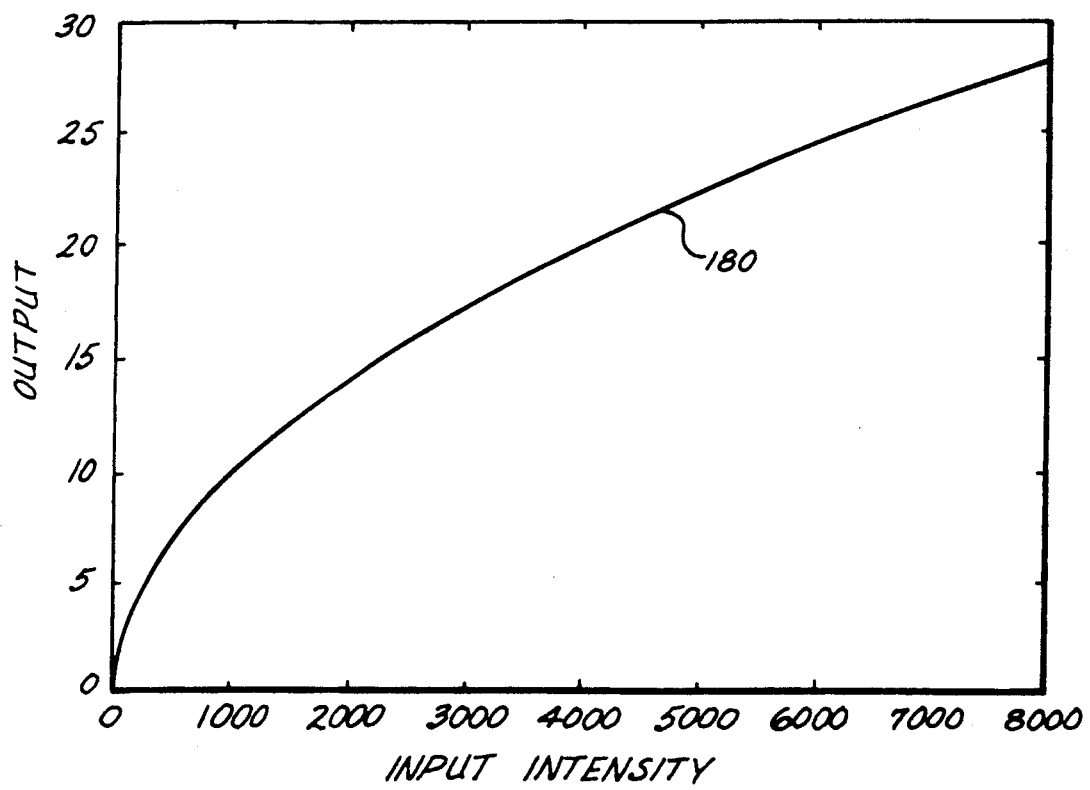
FIG. 18 is a graph of the input-output relationship in the absence of neural network interconnection.

FIG. 18 is a graph of the input-output relationship of a neural network without an interconnection scheme. It shows the response of a circuit without any network interactions. As in all the experimental results described in this specification, the data shown in FIG. 18 is valid only at cell locations as indexed by the cell number. Linear interpolation between the data points is for visual consistency only. It is clear that the output (see key in Figures) closely follows the input.

The sensory array which lacks interconnections reproduces the input without processing it. This would be the case for most conventional sensing apparatus such as CCD camera arrays. FIG. 18 also shows that noise is insignificant and the global interaction of the network has encountered small parameter variations such as variation of the level shifting stage among cells, as was depicted in Table 3.

FIG. 5 is a graph of the response of a neural network to a point-source input. The on-center off-surround shape of the response is similar to those observed in many excitable cells including the works mentioned above by Kuffler (1953), Hubel and Weisel (1959), and Barlow et al. (1964).

FIG. 5A is a graph of the receptive field of Lucilia sericata, where the horizontal axis is visual angle, and the vertical axis is relative voltage units of hyperpolarization. It is derived by measuring the response of the fly to gratings of different spatial frequencies. These gratings curve-fit the data to find an analytical expression for the provide a modulation transfer function (MTF), and perform an inverse Fourier transform on this expression.

This type of receptive field has been approximated by the difference of two Gaussian functions, a narrow excitatory center and a wide inhibitory surround, and is shown to be very similar to a gradient (Laplacian) operator. This work has been reported by Marr and Hildreth, in Theory of edge detection, PROC. OF THE ROYAL SOC. OF LONDON, (B) 207, pp. 187–217, 1980, and by Marr in VISION: A COMPUTATIONAL INVESTIGATION INTO THE HUMAN REPRESENTATION AND PROCESSING OF VISUAL INFORMATION, Freeman: San Francisco. Important properties of such receptive fields have been well documented and have given rise to a prominent school of thought in computational vision known as the "zero crossing school" since the second derivative of an edge which is smoothed by a Gaussians kernel is zero at the location of the edge and thus zero crossings of this function specify the edge locations.

Intensity Dependence

The zero-crossing computation is a feed forward linear operation. Although very effective, the zero-crossing computation does not possess the computational power or the versatility of the nonlinear shunting networks., specifically any of the properties discussed previously. One such property is adaptation to mean intensity level and is demonstrated in FIGS. 1 and 19.

Figure 19:
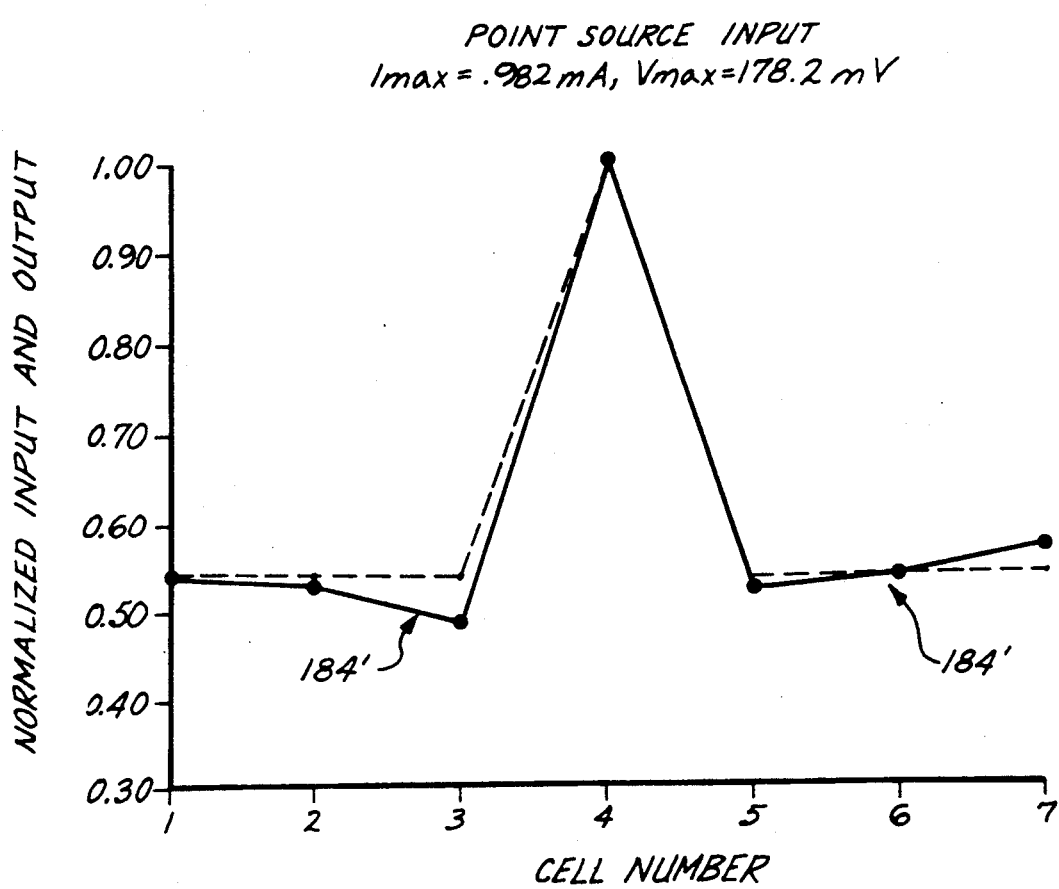
FIG. 19 is a graph of the adaptation of a neural network to mean intensity level, at a lower mean intensity than for FIG. 5.
Figure 19A:
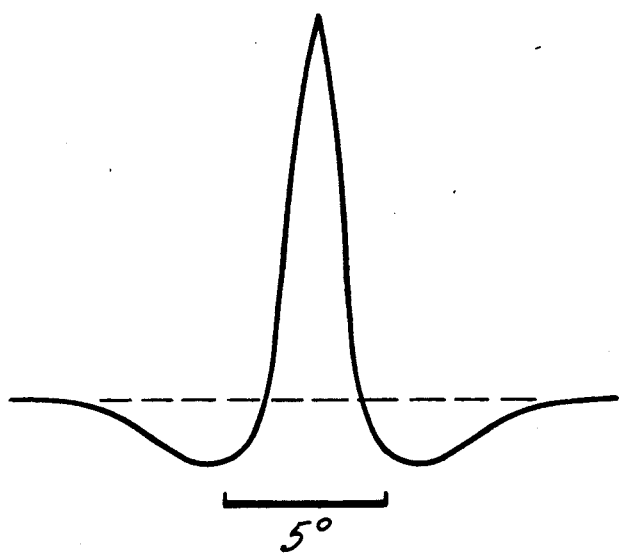
FIG. 19A is a graph of the receptive field of the LMC cell of *Lucilia sericata*, at lower luminance levels than for FIG. 5A.

Comparison of FIGS. 5 and 19 shows that as the background intensity increases the receptive field becomes more pronounced, the inhibitory flanks become relatively stronger showing higher levels of network interaction (compare 184 in FIG. 5 to 184' in FIG. 19. The profile of the receptive field thus changes according to the intensity level. FIG. 19A shows the strikingly similar behavior (i.e., increased flanks) found Lucilia (compare FIG. 5A). This proves the shunting networks are capable of mediating the receptive field adaptation to mean intensity level observed in many biological units such as the LMC cells of Lucilia. Theoretical analysis of multiplicative inhibitory networks had previously shown this property, as described in Product term nonlinear lateral inhibition enhances visual selectivity for small objects or edges, J. THEOR, BIOL., 100, pp. 525-531, 1983, The electrophysiological bases for linear and nonlinear product term lateral inhibition and the consequences for wide-field textured stimuli, J. THEROR. BIOL., 105, pp. 233-243, 1983, and Adaptation of receptive field spatial organization by multiplicative lateral inhibition, J. THEOR. BIOL., 110, pp. 435-444, 1984, However, no other implementation has replicated this behavior.

A modulation transfer function (MTF) can be defined as the Fourier transform of the receptive field, comparison of FIGS. 5 and 19 shows that, as the mean intensity increases, the MTF extends to higher spatial frequencies. Thus, the network "sees" with more detail in higher levels. This result has also been theoretically shown by Pinter, in his above-cited paper (Adaptation of spatial modulation transfer functions via nonlinear lateral inhibition, BIOLOGICAL CYBERNETICS, 51, pp. 285-291, 1985).

Intensity dependence is a very important property. It allows the use of available ambient light to better process the input. This provides one explanation for why a light switch is turned on to see better in low luminance levels even though the reflectances (the percentage of the light reflected from objects) are independent of the amount of light. The same applies to other sensory systems, a speaker is asked to speak louder to become more intelligible, even in the absence of noise, while the spectrogram of the speech does not change when the signal is amplified. This property is a result of the reflectance-luminance interaction which is specific to shunting networks.

FIGS. 5 and 19 have been normalized to better show their relative shapes and are clearly distinguishable even after normalization. Considering that the only difference between these two patterns is their background intensity, the network has in fact coded the intensity information as well. The difference between the two figures provides a clue to the amount of the intensity. As mentioned previously, preservation of the intensity clue has direct technological applications and is lost in most front-end processors which require carefully regulated lighting conditions or sensors whose output has to be normalized before any processing to avoid exceeding the dynamic range of processing circuitry. The luxury to encode both the pattern and its relative intensity is due to the unique wide dynamic range capability of shunting networks.

Boundary Effects

Figure 20:
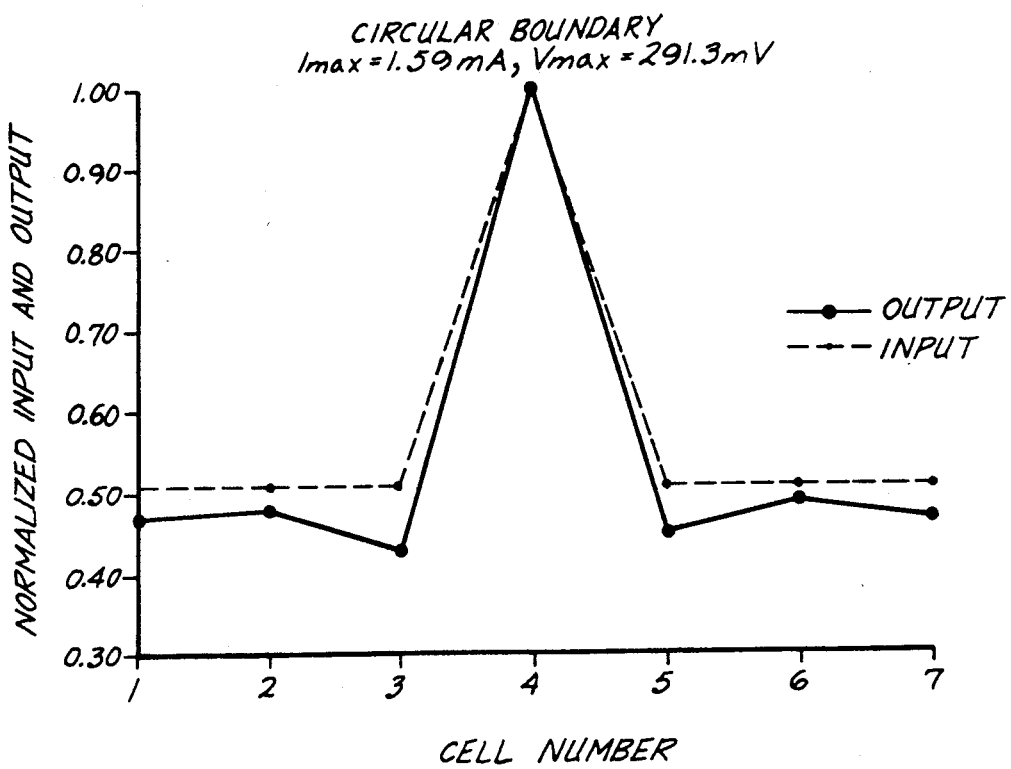
FIG. 20 is a graph demonstrating the fact that a circular boundary condition reduces the boundary effects and adds to the symmetry of the response of the neural network.

The asymmetry of the receptive field, especially the difference between the response of end cells 1 and 7 is due to component variation as well as the abrupt boundary. The effect of the boundary has been somewhat compensated by application of a dummy load to cells 1 and 7, but can be further reduced by connecting these cells together. Such a connection imposes a cyclic boundary condition on the network. The response is shown in FIG. 20. The boundary condition is equivalent to the application of a periodic replication of the input to an unlimited array of cells. The result is shown in FIG. 20, which is a graph demonstrating the fact that a circular boundary condition reduces the boundary effects and adds to the symmetry of the response of the neural network. The response is clearly much more symmetric than FIG. 5.

Tunability of Sensitivity

Figure 21:
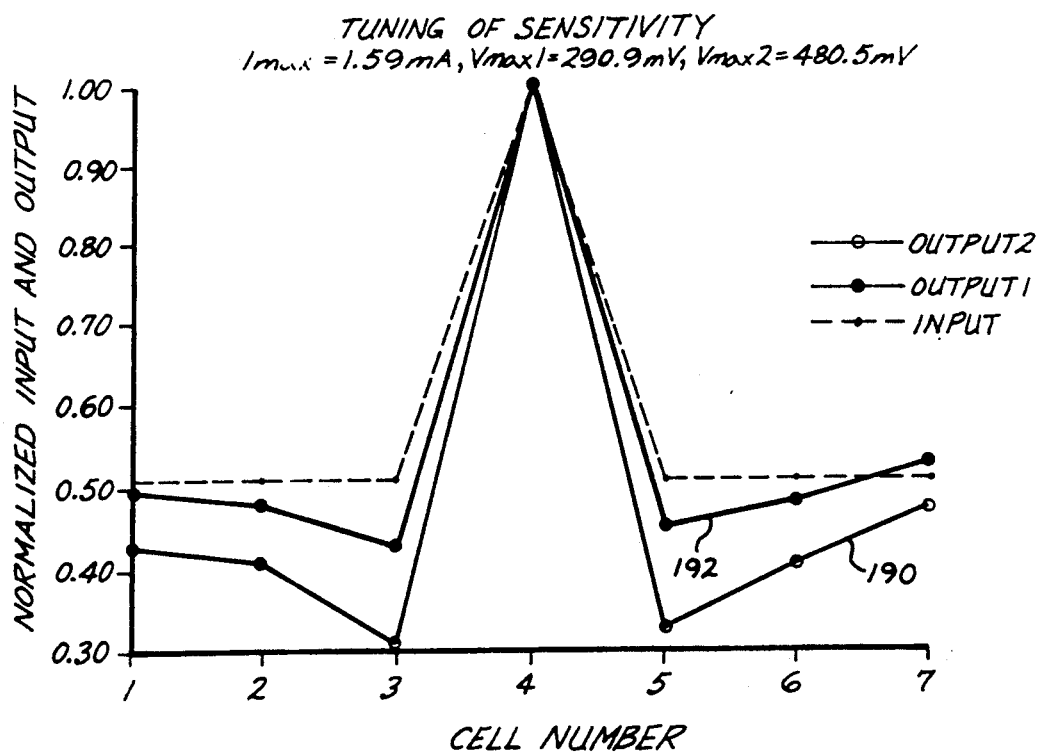
FIG. 21 is a graph of the tunability of the sensitivity, demonstrating that the same input pattern produces different behavior when the network is externally tuned to be more sensitive.

The sensitivity of a network to a set of parameters can be defined as the amount of change that is caused by the variation of these parameters. For the present network the sensitivity of each cell can be changed, or tuned, by varying the membrane resistance. This is seen by noting that each cell output equals the product of the input and the resistance seen by the input, i.e., $$x_i = I_i(R_o \| R_{eq}) \tag{20}$$

where $R_o$ is the membrane resistance and $R_{eq}$ is the equivalent resistance of the conductive paths established by multiplicative interconnects. The sensitivity of the network to variation of the membrane resistance is found from $$\frac{\partial x_i}{\partial R_0} = I_i \frac{R_{eq}^2}{(R_0 + R_{eq})^2} \tag{21}$$

which is a positive definite quantity. Hence, as the membrane resistance is increased, the output is increased. Thus, the cell shows more activity even though the input and interconnections have not varied. By changing the membrane resistance of all the cells in the network, the network can be tuned to be more, or less, sensitive to the environment. FIG. 21 is a graph of the tunability of the sensitivity. It shows experimental results concerning the tunability of the sensitivity. FIG. 21 demonstrates that the same input pattern produces different behavior when the network is externally tuned to be more sensitive. It also shows that the response represents a clear change of activity pattern, where the input pattern has remained constant but the network is tuned to be more sensitive.

The tuning can be accomplished by changing the bias on the transistor which models the membrane resistance.

Figure 2:
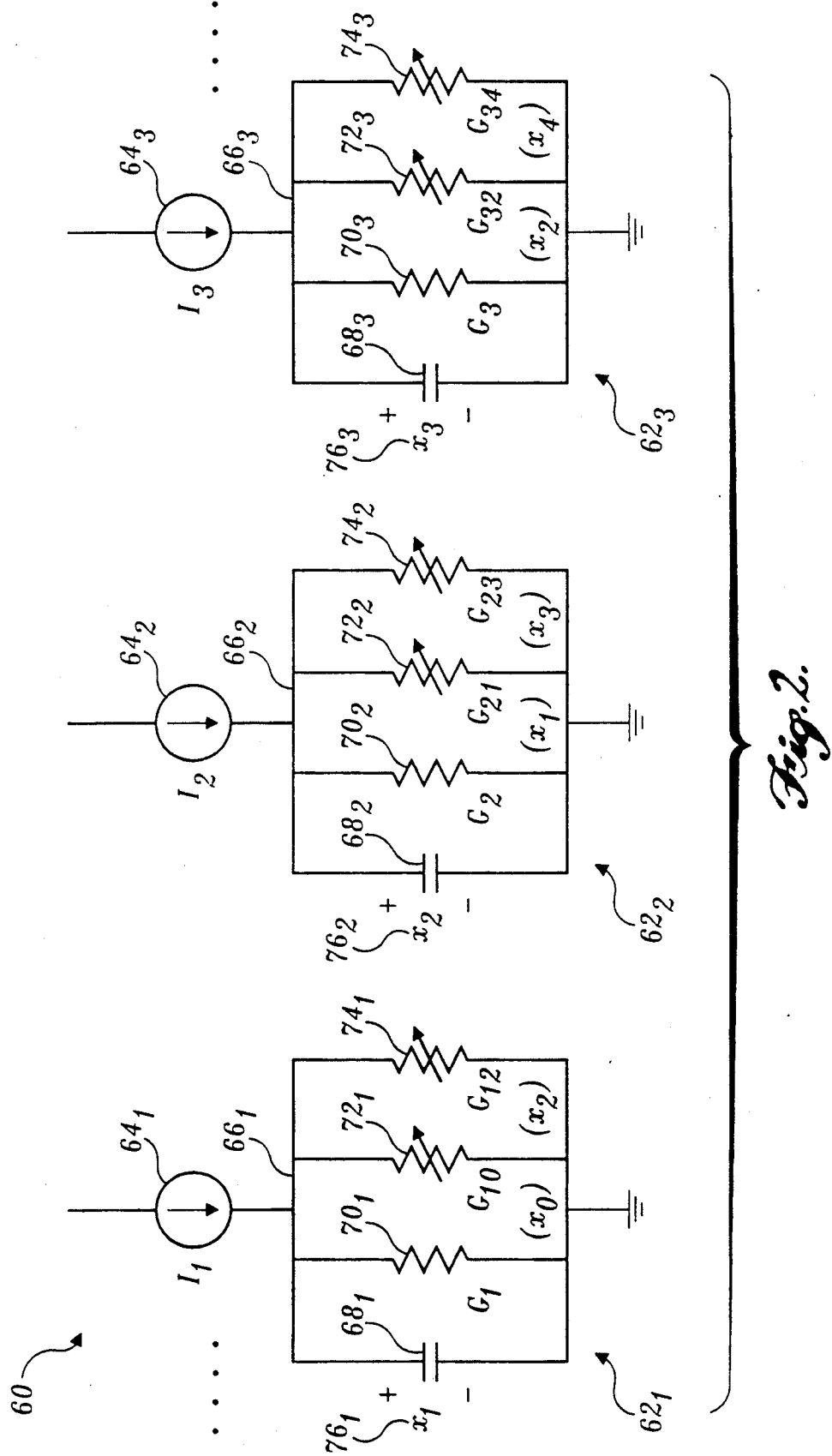
FIG. 2 is a schematic drawing of a circuit model of a neural network used for lateral inhibition.

The discovery of the tunability property and the very natural mechanism for achieving it is due to the insight provided by the original model of FIG. 2.1. The simple analytical explanation that required only two lines of equations (Eqs. 20 and 21) would have been much more complicated had it not been for the expected properties evident from the diagram that gave rise to the model. This property has not been previously analyzed or demonstrated. The simplicity of this property and its natural implementation by changing the bias of a transistor should not conceal its importance and applicability.

FIG. 21 shows how the sensor can be tuned to operate optimally in bright or dim lighting conditions. Curve 190 represent the response in relatively dim conditions while curve 192 represents the response in relatively bright conditions. The prospects of using this property in a self-regulating mechanism, which lets the device adapt its behavior according to the environment in which it is operating, is very promising.

It is logical to predict that a natural mechanism, such as self-modulating membrane resistances to adopt to sensitivity requirements, are employed in biological systems. Verification of this prediction and identification of the mechanisms that may mediate such a process are highly desirable.

Spatial Edge Response

Figure 22:
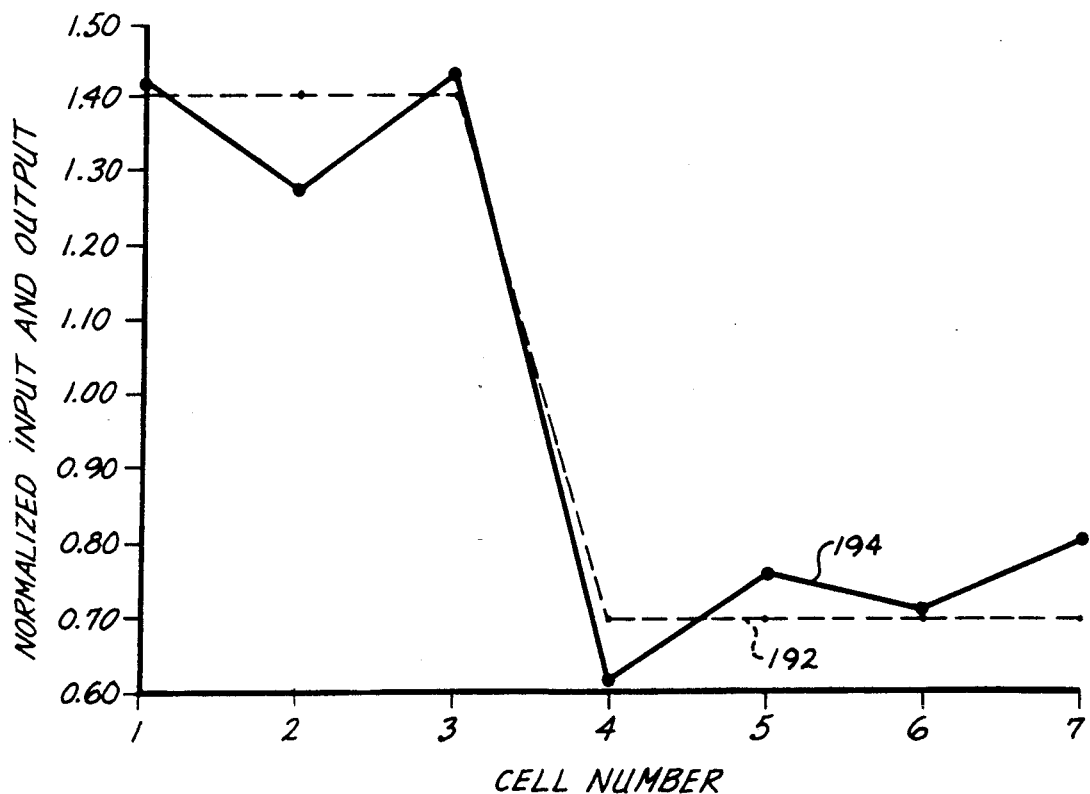
FIG. 22 is a graph of the response of the network to a spatial edge pattern, showing that edges are expanded and Mach bands are observed.

Edges, boundaries, and areas of high contrast specify important features of a scene. They also provide the areas of highest information. The response of the network to a spatial edge pattern is shown in FIG. 22, which is a graph of the response 194 of the network to a spatial edge pattern 192, showing that edges are expanded. Also, as described below, Mach bands are observed. The edges are enhanced and uniform areas are suppressed.

Figure 23:
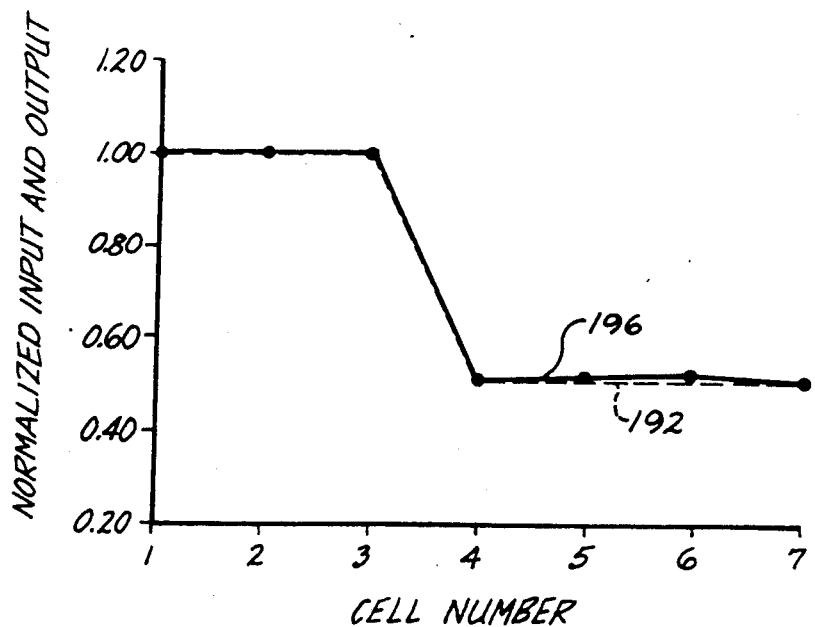
FIG. 23 is a graph of the response of the neural network without network interaction.

FIG. 23 is a graph of the response 196 of the neural network without network interaction, and is intended to be contrasted with the network behavior, in addition to showing the ignorable effect of noise.

Figure 24:
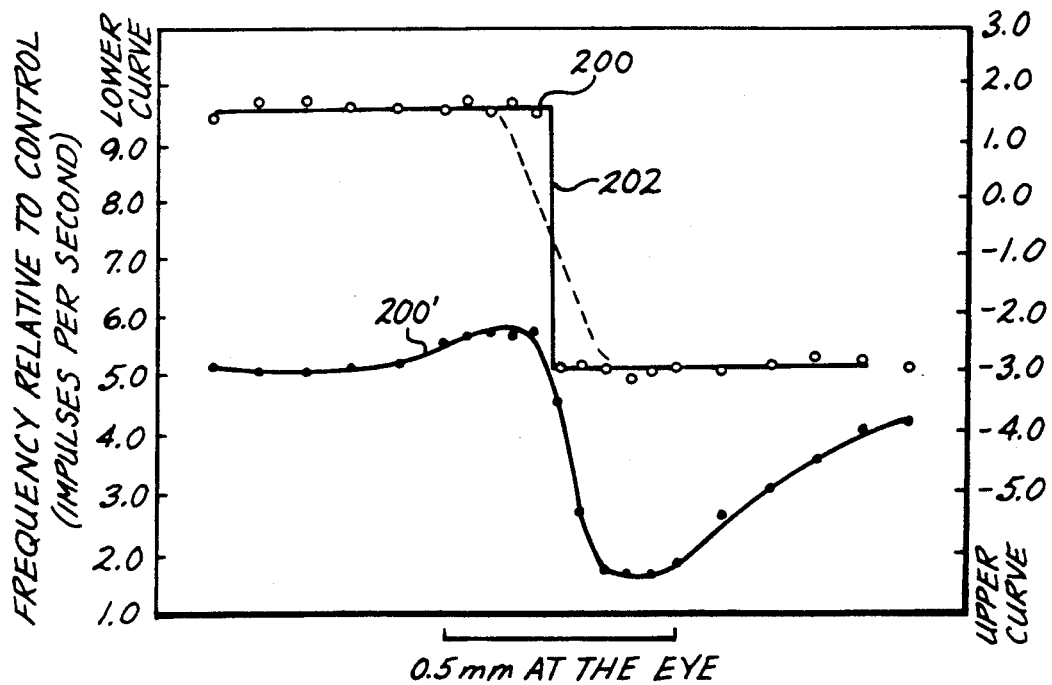
FIG. 24 is a graph of the response of the eccentric cell of the lateral eye of Limulus to a spatial edge pattern, showing the response of one ommatidium only and the effect of network interaction.
Figure 25:
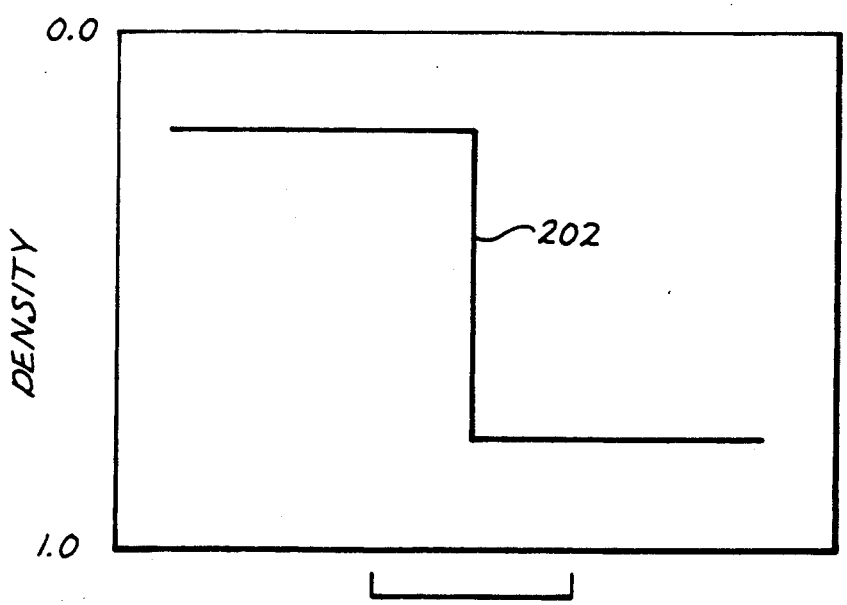
FIG. 25 is a graph of the spatial input pattern for FIG. 24.

The cells which are located next to the edge location (cells 3 and 4) also show an interesting response; they are less active than the next-nearest cells (cells 2 and 5) even though both sets of cells receive equal inputs. This phenomenon has been observed in psychophysical experiments and studied by Ernest Mach. The response is named Mach bands in his honor (Mach bands: Quantitative studies on neural networks in the retina, Holden-Day, by Ratliff, 1965). The seminal works of Hartline on the lateral compound eye of Limulus, which led to a Nobel prize, shows the same pattern of response and is shown in FIGS. 24 and 25 for comparison. FIG. 24 is a graph of the response 200 and 200' of the eccentric cell of the lateral eye of Limulus to a spatial edge pattern 202. It shows the response 202 of one ommatidium only (plotted as triangles) and the effect of network interaction 202' (plotted as circles). FIG. 25 is a graph of the spatial input pattern 202 for FIG. 24.

The importance of edge enhancement for image processing applications is well known, the simplicity of the design, the parallel construction of the network, and its operation in the below saturation region can quite possibly make the GaAs-based implementation of this circuit the fastest edge detector in existence today. It should be reminded that edge enhancement is only one feature of the diverse capabilities of this network.

A striking demonstration of the importance of the response of the type shown in FIGS. 22 and 24 is provided by Stockham (in Image processing in the context of a visual model, PROC. IEEE, vol. 60, No. 7, pp. 828-841, 1972). In the system whose response is shown in FIGS. 22 and 24, a filter cancelled the preprocessing accomplished by the peripheral visual system. The filter did so in such a way that the output of an edge pattern would "appear" as the input itself (as in FIG. 23). It was shown that such an edge pattern would be completely smeared and unrecognizable.

The test edge pattern used is a one pixel edge, i.e., the areas of high and low contrast are separated by one cell. Often edges are ramps which cover several intermediate cells. There is strong correlation between the degree of interconnections and the slope of the ramp, or the edge depth. The edge depth is preferentially enhanced by the network. Results of a study of directional selectivity are presented later. For edges of fixed depth, interconnectivity beyond the nearest neighbor produces a stable, geometrically decreasing oscillatory skirt around each spatial edge input. The decay rate of this spatial oscillation is dependent upon the contrast and intensity of the input edge, the membrane resistance, and the extent of interconnections.

Figure 26:
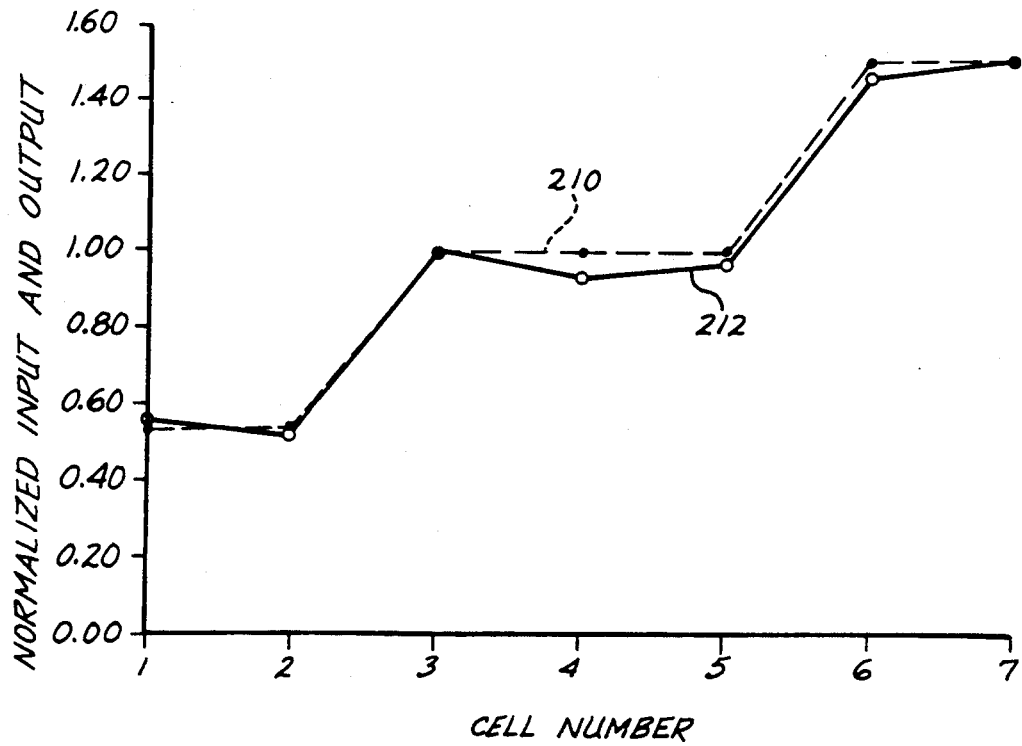
FIG. 26 is a graph demonstrating the contrast enhancement property.

Not all areas of contrast are edges. FIG. 26 is a graph demonstrating the contrast enhancement property. It shows a more complicated test pattern 210 than that of FIG. 24. As shown by the response 212, FIG. 26 demonstrates that the network is capable of contrast-enhancing even a complicated pattern. It has been confirmed that the network treats the input as noises when the pattern variation approaches the pixel level. It has also been established that the network cannot establish a correlation between different data points.

The smallest contrast for which the network produced a perceptible edge expansion was 1.1:1. Any edge pattern having a ratio of light side to dark side that is less than this ratio produces a noisy output pattern. From theoretical considerations of FIG. 11, this ratio may be improved by insertion of a sigmoidal nonlinearity in the feedback loop and optimizing the slope of this nonlinearity for the background input level.

Intensity Dependence

Figure 27:
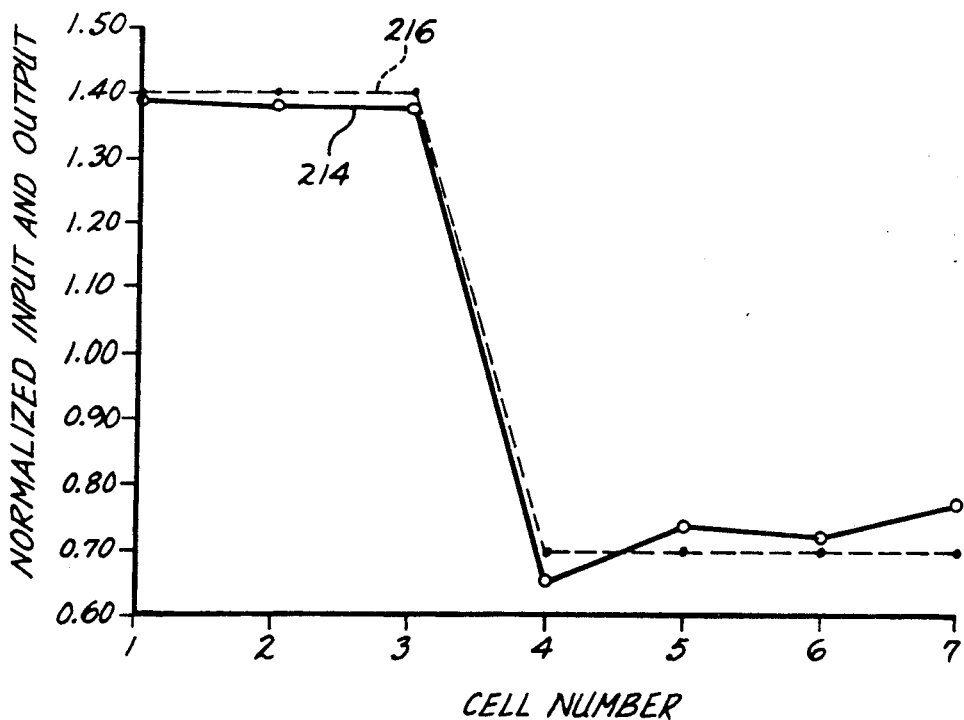
FIG. 27 is a graph of the response of the neural network to a spatial edge pattern with low mean intensity.
Figure 28:
FIG. 28 is a graph of the response of the eccentric cell of the lateral eye of Limulus to a limited extent ramped edge input.

FIG. 27 is a graph of the response 214 of the neural network to a spatial edge pattern 216 having a lower mean intensity than that shown in FIG. 22. Adaptation to mean intensity level which was shown for the point source input can also be observed for the spatial edge pattern. FIG. 28 is a graph of the response of the eccentric cell of the lateral eye of Limulus to a limited extent edge input, showing the clear correspondence of the experimental and theoretical results.

FIG. 27 has the same contrast as FIG. 22 but a smaller mean luminance level. The network is still capable of expanding the edges of the spatial edge pattern. However, the amount of expansion is reduced at dim light levels. FIG. 28 shows the response of Limulus to a limited spatial edge pattern and is chosen to stress the similarity at the boundaries.

FIG. 4 is a graph of the intensity dependence of the response of the neural network. In FIG. 4 the intensity of the input to the network is increased as shown and all curves are normalized. FIG. 4 demonstrates the network's adaptation to the mean intensity level of the input. As the intensity increases, the edges are expanded further. The conclusion is that the network thus performs better when more light is available. Enhancement of the input's edges in the space domain is translated into higher spatial frequencies in the frequency domain. Accordingly, as shown in FIG. 4, the modulation transfer function of the network is extended to higher frequencies as the input increases. Thus, the network gains bandwidth, or sees more detail, as more ambient light, or more total activity, is provided. Tuning the MTF and applying it to vision has been studied in detail by Pinter. Tunability of the network has been hereby experimentally verified in the studies described in this specification.

Figure 29:
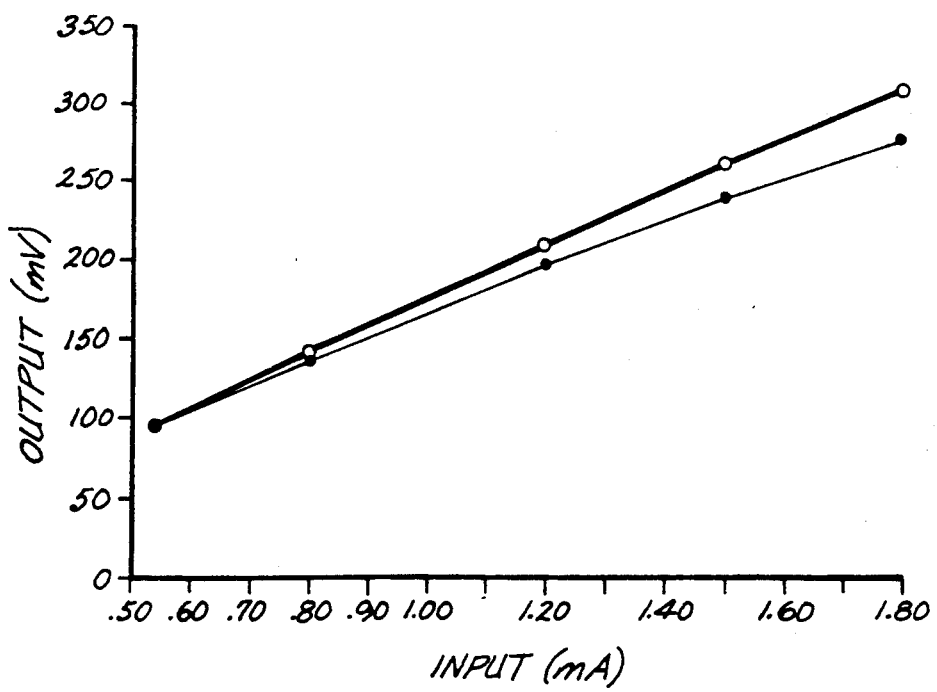
FIG. 29 is a graph of the intensity dependence of the response of each cell in the neural network.
Figure 30:
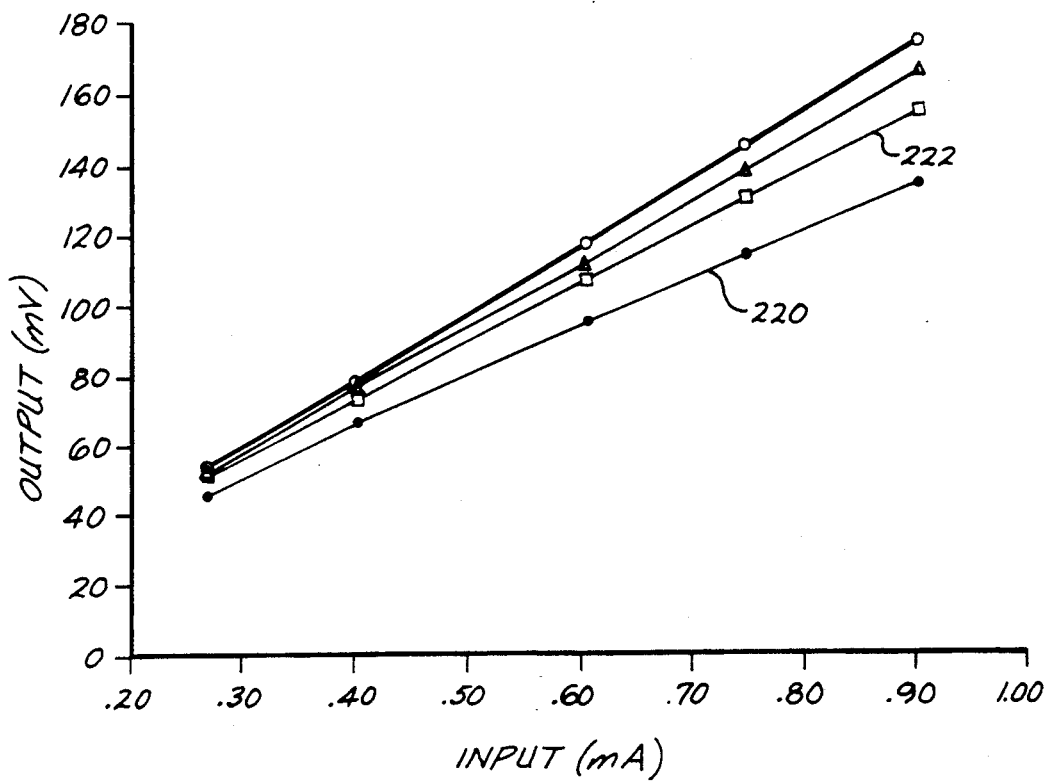
FIG. 30 is a graph of the intensity dependence of each cell in the neural network, showing the reflectance-intensity interdependence.

The response of each of the seven cells of the network in response to a change in the input pattern's intensity is plotted in FIGS. 29 and 30. Specifically, FIG. 30 is a graph of the intensity dependence of each cell in the neural network, showing the reflectance-intensity interdependence. The response of each cell is seen to be both a function of the input strength and the reflectance pattern. Cells 4 and 5, for example, (see curves 220 and 222 in FIG. 30) receive the same input but have drastically different responses to changes in intensity. The cells which most actively participate in processing of the reflectances, most conservatively respond to intensity change and thus preserve their dynamic range. This is consistent with the previously mentioned brightness contrast.

FIG. 4 and FIGS. 29–35 complement each other. In FIG. 4, the intensity dependence of reflectance processing is stressed. FIGS. 29 and 30 are graphs of the intensity dependence of the response of each cell in the neural network to changes in reflectance. FIGS. 4 and 29–35 are drawn from the same data. This proves the interdependence of the cells in the neural network. It also demonstrates the capability of shunting networks to capture some of the most salient features of peripheral visual processing.

The results shown in FIGS. 29 and 30 are, as expected, similar in shape to the uniform input response which was used to show intensity dependence properties of the network. Had the circuit been tuned to higher sensitivity, the curves would have shown stronger saturation properties.

Directional Selectivity

Figure 31:
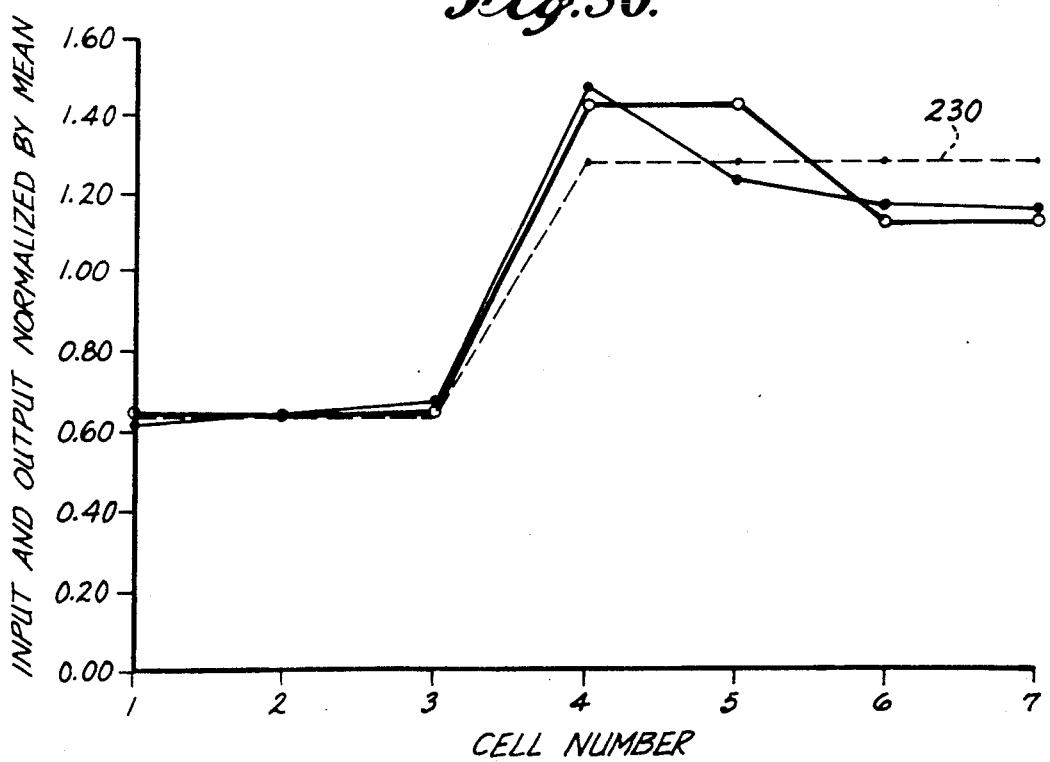
FIG. 31 is a graph of the directional selectivity (in the preferred direction) of the neural network, in which each cell receives input from its left-hand neighbor.
Figure 32:
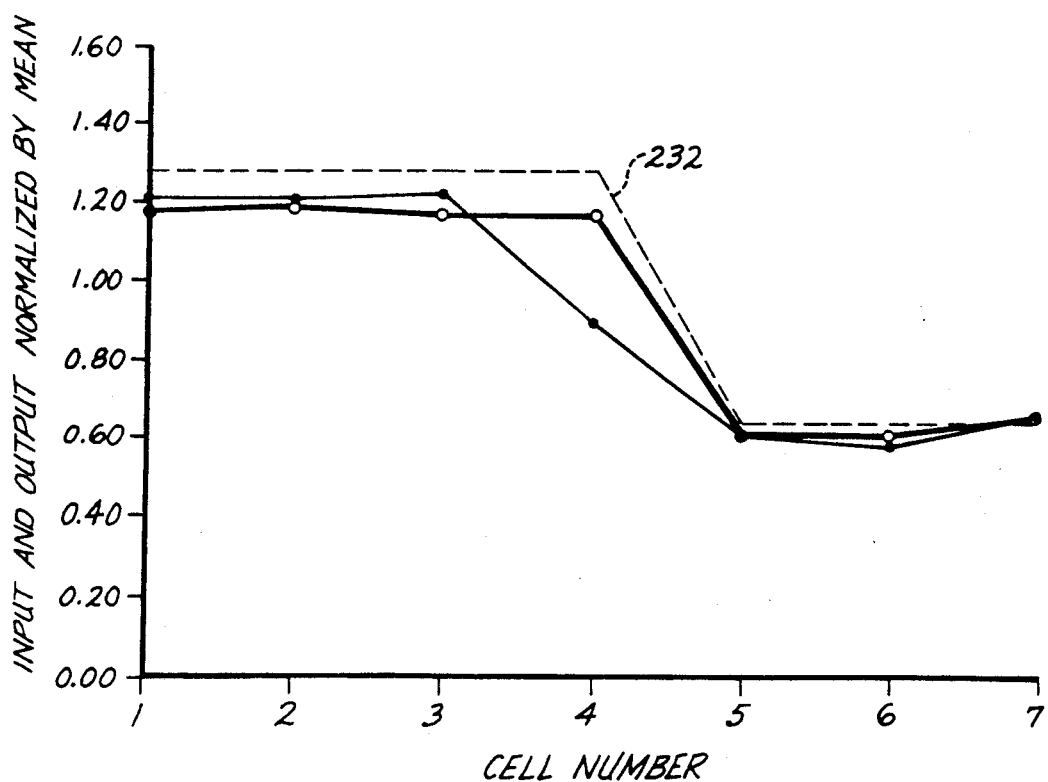
FIG. 32 is a graph of the directional selectivity (in the null direction) of the neural network, showing that direction of the input produces difference in response.

The network can be wired by choosing asymmetric interconnections to be preferentially responsive to an edge of a certain direction over other orientations. FIGS. 31 and 32 show the responses of a network which has only right going inhibitory connections, as the extreme case of asymmetry, to edge inputs of equal contrast and intensity but different directions. The input 230 in FIG. 31 is right-going while the input 232 in FIG. 32 is left-going. These figures are normalized by the same values so as to preserve the relative shape of the response. The boundary effects are also crucial since if cell 1 does not receive input from any other cell it will have disproportionally high value. The same applies to cell 2 which receives input only from cell 1. If these boundary effects are not compensated, they will dominate the response characteristics.

The solution to adverse boundary effects was provided by applying the output of the cell 1 to itself and cell 2. The boundary effects were applied in such a way that input appears to extend from the left.

As expected, FIGS. 31 and 32 show drastically different responses to edges 230 and 232 which only differ in orientation. The difference of response occurs in both the shape and intensity of the input pattern. Hence direction of the input pattern can be inferred from either shape or intensity. FIG. 31 is a graph of the directional selectivity (in the preferred direction) of the neural network, in which each cell receives input from its left-hand neighbor. As shown in FIG. 31, a right-going edge 230, which steps up from left to right, is contrast-enhanced in the usual manner. The response, in FIG. 32, to the left-going edge 232 is smeared and attenuated. Observation of the response of cell 4 alone can, in principle, determine the direction of the edge. FIG. 32 is a graph of the directional selectivity (in the null direction) of the neural network, showing that direction of the input produces differences in the response.

In response to a left-going edge, cells which receive higher intensity can more strongly inhibit other cells and thus attenuate the total activity of the network. The total activity level of FIG. 31 differs from that of FIG. 32 by 119 mV for two nearest neighbor connections and by 105 mV for only one nearest neighbor connection. By monitoring only the total activity of the network, it is possible to distinguish between two edges of same contrast and intensity but different orientation; the network is more "agitated" when an input with its preferential direction is presented.

Motion detection of an object within an image can readily be calculated by subtracting two edge-enhanced image frames which occur only some short time interval apart. This was described by Bouzerdoum and Pinter in Biophysical Basis, Stability, and Directional Response Characteristics of Multiplicative Lateral Inhibitory Neural Networks, PROC. INT. JOINT CONF. NEURAL NET., Washington D.C., 1989. In a network that is directionally sensitive to an input, an object moving to the left will produce a greater difference and will be more easily identified. Preferential directional sensitivity thus will result in preferential sensitivity.

Figure 33:
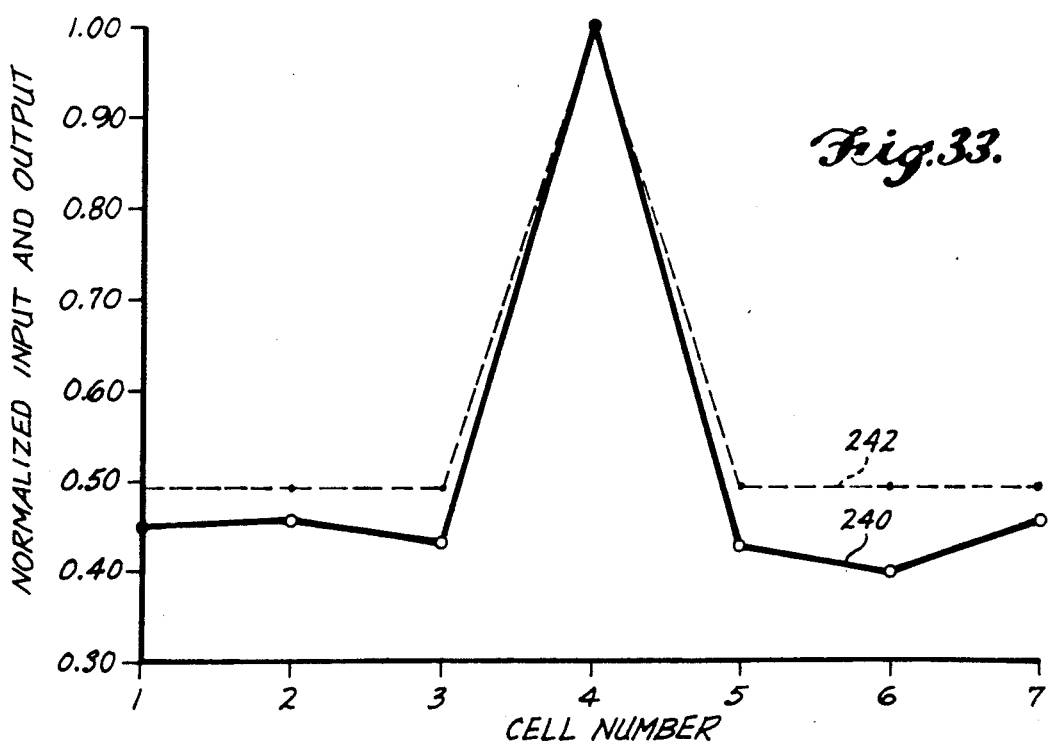
FIG. 33 is a graph of the receptive field of a unidirectional network wired for preferential directional and motion selectivity.

A preferentially weighted interconnection profile will produce an asymmetric receptive field, as shown in FIG. 33. Specifically, FIG. 33 is a graph of the response 240 of the receptive field of a unidirectional network wired for preferential directional and motion selectivity to a point source input 242. A point source response is thus sufficient to determine the preferred direction of response.

Although the above experiments were conducted with a one-dimensional array, the results can be extended to two-dimensional arrays to produce a direction preference of virtually any angle or localization to any area of the visual field. In such a case, it is desirable that the directional selectivity be dynamically programmable rather than pre-wired. Dynamic programmability is a subset of complete programmability of the connection strengths. However, it is much simpler to implement since only one line in the preferred direction is needed to transmit the required control signal. A device with programmable connection strength has been designed and tested and is used in an integrated circuit implementation which allows dynamic choice of directional preference. Fabrication and testing of this circuit is presently under way.

Another parameter of interest in FIGS. 31 and 32 is the effect of the extent of connections on the network properties. These Figures show that a network with nearest neighbor connections is more responsive to an abrupt edge than a network with two nearest neighbor connections.

Finally, unidirectionality is an extreme case of asymmetry. Asymmetric networks are hard to analyze and usually suffer from lack of stability. One such network is the asymmetric network studied by Cohen and Grossberg (Absolute stability of global pattern formation and parallel memory storage by competitive neural networks, 1983). This network could be arbitrarily close to a symmetric network but can be proven to be unstable regardless. Unidirectional networks, on the other hand, have lower (or upper) triangular connection matrices whose eigen values are the diagonal terms. Accordingly, it is easy to examine unidirectional networks for stability. The stability problem was avoided in the study of preferential selectivity by choosing the extreme case of unidirectional connections.

Although the equations given above are non-linear, small variations or low contrast will result in linearity (rather than non-linearity). Therefore, linear processing by the network is a subset of the non-linear adaptive processing described above.

Integrated Circuit Implementation on GaAs Substrate

The simplicity, compactness, and parallelism of the design presented in this specification, is adaptable to very high integration densities. As explained previously, this design can be implemented in any of the FET technologies, with the choice of technology depending on many engineering trade-offs. Since the projected application of the present work is for optoelectronic applications, gallium arsenide provides a potent medium with ample room for future expansion.

Monolithic fabrication of the circuit of FIG. 13 has been methodically pursued. The first step was to implement the discrete component version. This provided much insight into the operation of the circuit. This insight was presented above in this specification. All the circuit components which comprise the integrated circuit, i.e., MESFETs, photoconductors, and diodes, have been fabricated and tested. All the fabrication steps have been performed at the Solid State/Molecular Beam Epitaxy Laboratory of the University of Washington and include the following:

Growth of an active layer by molecular beam epitaxy (MBE) with optimally chosen active layer thickness and doping density, for operation below pinch off.

Production of photolithographic masks for different processing steps.

Wet chemical etching for mesa isolation.

Patterning of ohmic contacts, metal deposition (by lift-off), and sintering to provide ohmic contacts.

Wet chemical etching for exact channel depth.

Patterning of the gate contacts, deposition (by lift-off) of gate metal(s).

Testing.

Mounting and packaging.

A circuit consisting of linear arrays of 30 cells each, with nearest neighborhood interconnections, and with monolithic photodetectors has been designed and laid out with 2-micron design rules. Provisions for variable membrane resistance for tuning of the sensitivity have been made.

A second circuit which has the additional feature of programmable connection strengths has also been designed and laid out and is awaiting fabrication. In order to reduce the complexity, the programmability feature is used only for preferential directional selectivity studies.

In these circuits, a novel ohmic contact mesa-finger photodetector has been used. The photodetector produces five to six times the photocurrent of standard metal-semiconductor-metal (MSM) photodetectors in steady state, while being capable of operating at the same speed. All of the process steps required for the fabrication of these detectors are fully compatible with the steps used in the fabrication of mesa-isolated MESFETs and diodes which comprise the rest of the circuitry, and hence a fully monolithic optoelectronic circuit is being built.

It must once again be stressed that every effort was made to have the test results of the monolithic circuit available for presentation in this manuscript but unavoidable difficulties inherent in the fabrication of such complicated circuitry prevented this desire to be realized. Future publications are planned to report on the design considerations, process and device aspects, and optoelectronic applications of the monolithic circuit. Transduction and processing of color information.

In the above descriptions, the inputs to the processing are monochromatic. That is, the photodetectors sense only the incident intensity or a pattern luminance. The pattern luminance is detected via its spectrally integrated radiative power, not its spectrum. To have color vision processing, it is well known that three sufficiently separate primary or basis vector colors are usually satisfactory. In biological vision, this is often the case, and it is also true that lateral inhibitory color processing has been demonstrated. For example, effects of such color lateral inhibition have been found in vertebrate ganglion cells having red on-excitatory centers and green on-inhibitory centers. There are other combinations, and relative timing of color signals may also be of importance. However, it is well known that there are color antagonistic effects, and these antagonistic effects occur between the various photoreceptor spectral sensitivity functions.

In a two, three or more primary color system each pixel (picture element) selectively receives different spectral colors. In such a system, it is necessary to have a separate but integrated photodetector in each pixel for each color. The spectral differentiation of the photodetectors may be accomplished by band gap engineering or using applied spectral filters. The first case is particularly applicable to compound semiconductors such as GaAs or InP which readily form heterojunctions with a wide range of alloys. The band gap of these materials can be easily controlled by the alloy constituency. The resulting band gap of the semiconductor sets the wavelength at which the fundamental absorption edge occurs. Thus, spectral differentiation can be accomplished directly by using several integrated detectors for each pixel with a different band gap for each. Alloys of (In, Ga) As can be grown lattice-mismatched to GaAs and alloys of (In, Ga) (As, P) can be grown lattice-matched to InP. The effective range of spectral tunability for alloys (In, Ga) is 0.8–1.2 microns and the effective range of spectral tunability for alloys of (In, Ga) (As, P) is 0.8–1.6 microns. Hence, photodetectors fabricated in this manner would provide spectral selectivity principally in the infrared wavelengths.

Alternatively, dielectric absorptive filter layers can be fabricated directly on top of the photodetectors. This gives the detectors a spectral selectivity set by the transmittance of the filter layer. This technique is in popular use in the construction of color CCD cameras. CCD cameras use three photodetectors per pixel with filters for the R, G, B primary signals. This approach is much more applicable to the visible spectrum. The reason is that the band gaps of the most common semiconductor alloys do not extend up to photon energies this high. The choice of the appropriate photodetector technology to implement spectrally selective response characteristics is quite broad. These technologies are all generally compatible with monolithic integration with field-effect transistors. This integration is a key element for implementing the lateral inhibitory or excitatory interconnections between the adjacent pixels.

As an example, consider the primary colors as red, green, and blue; R, G, B. These colors necessitate a three layer lateral inhibitory sensory neural network where the inhibitory cross-coupling between and among layers need not be the same for each color R, G, B. This may be expressed in the equations of the three layers, $$\frac{de_i^R}{dt} = I_i^R - e_i^R \left(1 + \sum_{RGB} \sum_j f_j(e_j^k)\right)$$

$$\frac{de_i^G}{dt} = I_i^G - e_i^G \left(1 + \sum_{RGB} \sum_j g_j(e_j^k)\right)$$

$$\frac{de_i^B}{dt} = I_i^B - e_i^B \left(1 + \sum_{RGB} \sum_j h_j(e_j^k)\right)$$

where the R, G, B superscripts signify the node voltage responding excitatorily (positively) primarily to that spectral color, and the nonlinear lateral inhibition occurs via the different functions $f_j$, $g_j$, h, for each respective node voltage, over all the layers. This encompasses a quite general color processing. The linearization of these equations would demonstrate all possible combinations of color center-surround. The nonlinear equations in and of themselves are adaptive to the mean color luminances. Their adaptability is in the same sense of adaptation to monochromatic light shown above. Examples are the increase of surround inhibition as mean luminance is raised, and the automatic gain control feature.

Transduction and processing of polarization information

Terrestrial and flying insects sense polarization of the E vector of the skylight. In many cases, they utilize this information to navigate. Humans utilize polarizing material in sunglasses to remove polarized light selectively. An example of polarized light is the glaring reflection from a water surface.

Polarized light can be also used to differentiate among various objects via the difference in specular vs. diffuse reflection. These differences can be exploited in transduction of light by integrated optical components constituting two or more photodetectors underlying each pixel (picture element). Similar to color selectivity, preferential polarization detection can be implemented in monolithically integrated photodetectors in either of two ways. One way is the inherent response of the detector itself. The other way is the use of a polarizing thin film deposited over the top of the photodetector. In the first case, photodetectors with interdigital collection electrodes can be easily fabricated to finger widths of 0.5–1.0 microns. This is directly comparable to the wavelength of light. Thus the grid pattern of the electrodes can be used to differentiate the linear polarizations that are parallel to the fingers from those that are perpendicular to the fingers. This is due to the different diffraction efficiencies of the TE and TM cases. The difference in the responses to these two polarizations is typically 20–30 percent. Much greater polarization selectivity can be obtained by the use of nematic thin films. The most common example of nematic thin films is Polaroid films. A Polaroid film can be added as a prefilter to the photodetectors of each pixel.

As an example of processing of this information in many useful ways, consider the color primaries above now equivalent to E vector polarization angles, such as:
$R = E_{90°}$
$G = E_{225°}$
$B = E_{316°}$,
where each superscript attached to a node voltage signifies its preferred polarization angle. In this particular example, the polarization angles are 90, 225 and 315 degrees. This is not unlike what is known for the insect photoreceptors and optic lobe. If the number of layers of equation (1) is expanded to nine, each color primary could be sensed and processed at each of the polarization angles. This scheme would be capable of processing or distinguishing many optical scene combinations.

While the detailed description above has been expressed in terms of specific embodiments, those skilled in the art will appreciate that many other embodiments could be used to accomplish the purpose of the disclosed inventive apparatus. In particular it will be understood that the scope of the invention includes neural network which are connected between layers as well as within a layer. Accordingly, it can be appreciated that various modifications of the above-described embodiments may be made without departing from the spirit and the scope of the invention. Therefore, the present invention is to be limited only by the following claims.

We claim:

1. A neural network for processing light energy having a plurality of characteristics, comprising:
   a plurality of layers of cells, each cell in a layer having one or more neighboring cells in that layer, each layer of cells being connected in a neighboring relationship for processing light energy having a distinct one of the plurality of characteristics, each cell comprising:
   selective means for receiving an input signal representing an input corespondent to light energy having the characteristic to be processing by the layer in which the cell belongs;
   means for transforming the input signal to a corresponding current produced by a current source, the current being transmitted through a capacitive element and producing a resulting change in a voltage across the capacitive element;
   programmable means for sensing the states of the one or more neighboring cells;
   means for producing a conductance corresponding to each of the states in a feedforward subset of the states of the one or more neighboring cells;
   means for producing a conductance corresponding to each of the states in a feedback subset of the states of the one or more neighboring cells, the feedback subset being disjoint from the feedforward subset;
   means for producing a positive state voltage corresponding to the state of the cell, the positive state voltage being transmitted through the capacitive element and producing a resulting change in a voltage across the capacitive element;
   means for producing a positive feedback voltage corresponding to each of the states in the feedback subset of the states of the adjacent cells, the positive feedback voltage being transmitted through the capacitive element and producing a resulting feedback change in the state voltage across the capacitive element; and means for producing a negative feedforward voltage corresponding to each of the states in the feedforward subset of the states of the adjacent cells, the negative feedforward voltage being transmitted through the capacitive element and producing a resulting feedforward change in the state voltage across the capacitive element;

the voltage across the capacitive element representing the state of the cell.

2. The neural network of claim 1 wherein means for transforming the input signal to the corresponding conductance is formed from the parallel combination of a plurality of transistors having conductances that are individually controlled in accordance with the states of the one or more neighboring cells.

3. The neural network of claim 2 wherein each of the transistors is formed in an integrated circuit.

4. The neural network of claim 2 wherein the transistors are field effect transistors.

5. The neural network of claim 4 wherein each of the field effect transistors is formed in an integrated circuit.

6. A neural network for processing light energy having a plurality of characteristics, comprising:

a plurality of layers of cells, each cell in a layer having one or more neighboring cells in that layer, each layer of cells being connected in a neighboring relationship for processing light energy having a distinct one of the plurality of characteristics, each cell comprising:

selective means for receiving an input signal representing an input corespondent to light energy having the characteristic to be processing by the layer in which the cell belongs;

means for transforming the input signal to a corresponding current produced by a current source, the current being transmitted through a capacitive element and producing a resulting change in a voltage across the capacitive element;

programmable means for sensing the states of the one or more neighboring cells;

means for producing a conductance corresponding to each of the states in a feedforward subset of the states of the one or more neighboring cells;

means for producing a conductance corresponding to each of the states in a feedback subset of the states of the one or more neighboring cells, the feedback subset being disjoint from the feedforward subset;

means for producing a positive state voltage corresponding to the state of the cell, the positive state voltage being transmitted through the capacitive element and producing a resulting change in a voltage across the capacitive element;

means for producing a positive feedback voltage corresponding to each of the states in the feedback subset of the states of the adjacent cells, the positive feedback voltage being transmitted through the capacitive element and producing a resulting feedback change in the state voltage across the capacitive element; and means for producing a negative feedforward voltage corresponding to each of the states in the feedforward subset of the states of the adjacent cells, the negative feedforward voltage being transmitted through the capactive element and producing a resulting feedforward change in the state voltage across the capacitive element;

the voltage across the capacitive element representing the state of the cell.

7. The neural network of claim 6 wherein means for transforming the sensory input signal to the corresponding conductance is formed from the parallel combination of a plurality of transistors having conductances that are individually controlled in accordance with the states of the one or more neighboring cells.

8. The neural network of claim 7 wherein each of the transistors is formed in an integrated circuit.

9. The neural network of claim 7 wherein the transistors are field effect transistors.

10. The neural network of claim 9 wherein each of the field effect transistors is formed in an integrated circuit.

11. A neural network for processing light energy consisting of a plurality of wavelengths, comprising:

a plurality of layers of cells, each cell in a layer having one or more neighboring cells in that layer, each layer of cells being connected in a neighboring relationship for processing light energy having a distinct wavelength in the plurality of wavelengths, each cell comprising:

selective means for receiving an input signal representing an input corespondent to light energy having the distinct wavelength corespondent to the wavelength to be processed by the layer in which the cell belongs;

means for transforming the input signal to a corresponding current produced by a current source, the current being transmitted through a capacitive element and producing a resulting change in a voltage across the capacitive element;

programmable means for sensing the states of the one or more neighboring cells;

means for producing a conductance corresponding to each of the states in a feedforward subset of the states of the one or more neighboring cells;

means for producing a conductance corresponding to each of the states in a feedback subset of the states of the one or more neighboring cells, the feedback subset being disjoint from the feedforward subset;

means for producing a positive state voltage corresponding to the state of the cell, the positive state voltage being transmitted through the capacitive element and producing a resulting change in a voltage across the capacitive element;

means for producing a positive feedback voltage corresponding to each of the states in the feedback subset of the states of the adjacent cells, the positive feedback voltage being transmitted through the capacitive element and producing a resulting feedback change in the state voltage across the capacitive element; and means for producing a negative feedforward voltage corresponding to each of the states in the feedforward subset of the states of the adjacent cells, the negative feedforward voltage being transmitted through the capacitive element and producing a resulting feedforward change in the state voltage across the capacitive element;

the voltage across the capacitive element representing the state of the cell.

12. The neural network of claim 11 wherein means for transforming the input signal to the corresponding conductance is formed from the parallel combination of a plurality of transistors having conductances that are individually controlled in accordance with the states of the one or more neighboring cells.

13. The neural network of claim 12 wherein each of the transistors is formed in an integrated circuit.

14. The neural network of claim 12 wherein the transistors are field effect transistors.

15. The neural network of claim 14 wherein each of the field effect transistors is formed in an integrated circuit.

16. The neural network of claim 11, wherein the plurality of wavelengths are in the red, green, and blue light spectral regions.

17. A neural network for processing light energy having a plurality of distinct polarizations, comprising:
a plurality of layers of cells, each cell in a layer having one or more neighboring cells in that layer, each layer of cells being connected in a neighboring relationship for processing light energy having a distinct one of the distinct polarizations, each cell comprising:
selective means for receiving an input signal representing an input corespondent to light energy having the distinct polarization to be processing by the layer in which the cell belongs;
means for transforming the input signal to a corresponding current produced by a current source, the current being transmitted through a capacitive element and producing a resulting change in a voltage across the capacitive element;
programmable means for sensing the states of the one or more neighboring cells;
means for producing a conductance corresponding to each of the states in a feedforward subset of the states of the one or more neighboring cells;
means for producing a conductance corresponding to each of the states in a feedback subset of the states of the one or more neighboring cells, the feedback subset being disjoint from the feedforward subset;
means for producing a positive state voltage corresponding to the state of the cell, the positive state voltage being transmitted through the capacitive element and producing a resulting change in a voltage across the capacitive element;
means for producing a positive feedback voltage corresponding to each of the states in the feedback subset of the states of the adjacent cells, the positive feedback voltage being transmitted through the capacitive element and producing a resulting feedback change in the state voltage across the capacitive element; and
means for producing a negative feedforward voltage corresponding to each of the states in the feedforward subset of the states of the adjacent cells, the negative feedforward voltage being transmitted through the capacitive element and producing a resulting feedforward change in the state voltage across the capacitive element;
the voltage across the capacitive element representing the state of the cell.

18. The neural network of claim 17 wherein means for transforming the sensory input signal to the corresponding conductance is formed from the parallel combination of a plurality of transistors having conductances that are individually controlled in accordance with the states of the one or more neighboring cells.

19. The neural network of claim 18 wherein each of the transistors is formed in an integrated circuit.

20. The neural network of claim 18 wherein the transistors are field effect transistors.

21. The neural network of claim 20 wherein each of the field effect transistors is formed in an integrated circuit.

22. The neural network of claim 17 wherein the plurality of polarizations are orthogonal polarizations.

23. The neural network of claim 22 wherein the plurality of polarizations are orthogonal linear polarizations.

24. The neural network of claim 22 wherein the plurality of polarizations are orthogonal circular polarizations.

25. A neural network comprising a plurality of cells and means for connecting each cell to one or more neighbor cells, each cell comprising:
a photodetector for receiving optical illumination and for producing a corresponding input current; and
circuit means having a variable conductivity, the circuit means comprising means for receiving the input current for the cell and for conducting the input current such that a voltage is produced across the circuit means, the voltage comprising a state value for the cell, the conductivity of the circuit means being in part a function of the product of the state value of the cell and the state value of one of the neighbor cells.

26. The neural network of claim 25, wherein each cell is connected to at least first and second neighbor cells and comprises first and second conductance elements connected in parallel, the first conductance element having a conductance that is a function of the product of the state value of the cell and the state value of the first neighbor cell, and the second conductance element having a conductance that is a function of the product of the state value of the cell and the state value of the second neighbor cell.

27. The neural network of claim 26, wherein each conductance element comprises a field effect transistor having a gate coupled to the respective neighbor cell.

28. The neural network of claim 27, wherein each field effect transistor is formed in an integrated circuit.

29. The neural network of claim 26, wherein each circuit means comprises a capacitive element connected in parallel with the conductance elements.

30. The neural network of claim 25, wherein each cell further comprises a voltage shifter circuit for producing an output voltage that differs from the state value by an amount independent of the state value, and means for coupling the output voltage to at least one neighbor cell, and wherein the conductivity of the circuit means is in part a function of the product of the state value of the cell and the output voltage of the neighbor cell.

31. The neural network of claim 26, wherein the cells are arranged in a sequence in which for each cell, the first and second neighbor cells are positioned immediately adjacent to the cell in the sequence, and wherein each cell further comprises means for attenuating the state voltage coupled to the first neighbor cell with respect to the state voltage coupled to the second neighbor cell, whereby the response of the network is asymmetric along said sequence.

* * * * *

UNITED STATES PATENT AND TRADEMARK OFFICE
CERTIFICATE OF CORRECTION

PATENT NO. : 5,130,563

DATED : July 14, 1992

INVENTOR(S) : B. Nabet et al.

Page 1 of 2

It is certified that error appears in the above-identified patent and that said Letters Patent is hereby corrected as shown below:

On the title page, Item [56], In Other Publications, "Bashor" should read —Bushor—.

On the title page, Item [57] line 3, "comprise" should read —comprises—.

| | |
|---|---|
| Column 10, lines 4-5 | "vol-tage controlled" should read --voltage-controlled-- |
| Column 11, lines 50-54 (Equation 9) | "$\sum_{j \neq 1} v_j$" should read --$\sum_{j \neq 1} v_j$-- |
| Column 15, line 30 | "cross-sections" should read --cross sections-- |
| Column 15, line 62 | "depletionmode" should read --depletion-mode-- |
| Column 15, line 65 | "GaAsbased" should read --GaAs-based-- |
| Column 16, line 9 | "depletionmode" should read --depletion-mode-- |
| Column 16, line 10 | "enhancementmode" should read --enhancement-mode-- |
| Column 16, lines 11-12 | "metal-semi-contuctormetal" should read --metal-semiconductor-metal-- |
| Column 17, line 3 | "implicity" should read --implicitly-- |
| Column 17, line 25 | "selfinhibition" should read --self-inhibition-- |
| Column 17, line 31 | "cell-inhibition" should read --self-inhibition-- |

UNITED STATES PATENT AND TRADEMARK OFFICE
CERTIFICATE OF CORRECTION

PATENT NO. : 5,130,563    Page 2 of 2
DATED : July 14, 1992
INVENTOR(S) : B. Nabet et al.

It is certified that error appears in the above-identified patent and that said Letters Patent is hereby corrected as shown below:

| | |
|---|---|
| Column 22, line 41 | "for the" should read --to-- |
| Column 23, line 11 | "the" should read --that-- |
| Column 23, line 23 | "THEROR." should read --THEOR-- |
| Column 32, line 39 | "corespondent" should read --correspondent-- |
| Column 33, line 31 | "corespondent" should read --correspondent-- |
| Column 34, line 23 | "corespondent" should read --correspondent-- |
| Column 34, line 24 | "corespondent" should read --correspondent-- |
| Column 35 line 20 | "corespondent" should read --correspondent-- |

Signed and Sealed this

Twelfth Day of October, 1993

*Attest:*

BRUCE LEHMAN

*Attesting Officer*    *Commissioner of Patents and Trademarks*